US012777505B2

(12) United States Patent
Leon Calvo

(10) Patent No.: US 12,777,505 B2
(45) Date of Patent: Oct. 27, 2026

(54) SIDELINK COORDINATION BETWEEN A TRANSMITTING DEVICE AND A RECEIVING DEVICE

(71) Applicant: Telefonaktiebolaget LM Ericsson (publ), Stockholm (SE)

(72) Inventor: Jose Angel Leon Calvo, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 290 days.

(21) Appl. No.: 18/290,780

(22) PCT Filed: Aug. 5, 2022

(86) PCT No.: PCT/SE2022/050741
§ 371 (c)(1),
(2) Date: Jan. 21, 2024

(87) PCT Pub. No.: WO2023/014273
PCT Pub. Date: Feb. 9, 2023

(65) Prior Publication Data
US 2024/0260064 A1 Aug. 1, 2024

Related U.S. Application Data
(60) Provisional application No. 63/229,829, filed on Aug. 5, 2021.

(51) Int. Cl.
*H04W 72/40* (2023.01)
*H04W 72/25* (2023.01)

(52) U.S. Cl.
CPC ........... *H04W 72/40* (2023.01); *H04W 72/25* (2023.01)

(58) Field of Classification Search
None
See application file for complete search history.

(56) References Cited

U.S. PATENT DOCUMENTS

2017/0188391 A1 6/2017 Rajagopal et al.
2018/0234911 A1 8/2018 Zhao et al.
(Continued)

FOREIGN PATENT DOCUMENTS

CN 112333661 A 2/2021
EP 2975792 A1 1/2016
(Continued)

OTHER PUBLICATIONS

Author Unknown, "Technical Specification Group Radio Access Network; Study on evaluation methodology of new Vehicle-to-Everything (V2X) use cases for LTE and NR; (Release 15)," Technical Report 37.885, Version 15.3.0, Jun. 2019, 3GPP Organizational Partners, 38 pages.
(Continued)

*Primary Examiner* — Scott M Sciacca
(74) *Attorney, Agent, or Firm* — Withrow & Terranova, PLLC

(57) ABSTRACT

Embodiments of the present disclosure provide a method performed by a transmitting wireless device for enabling coordination with a receiving wireless device. The method comprises: transmitting, to the receiving wireless device, a coordination message that indicates whether coordination information is expected; and receiving, in response to the coordination message indicating that coordination information is expected, the coordination information from the receiving wireless device in accordance with a format indicated in the coordination message. The disclosure further provides a method performed by a receiving wireless device for enabling coordination with a transmitting wireless device. Corresponding transmitting wireless device, and receiving wireless device are also disclosed.

15 Claims, 10 Drawing Sheets

(56) References Cited

U.S. PATENT DOCUMENTS

| | | | | |
|---|---|---|---|---|
| 2019/0306835 | A1 | 10/2019 | Hoang et al. | |
| 2020/0068609 | A1 | 2/2020 | Wang et al. | |
| 2020/0288435 | A1 | 9/2020 | Kwak et al. | |
| 2020/0314916 | A1 | 10/2020 | Park et al. | |
| 2021/0352679 | A1 | 11/2021 | Baghel et al. | |
| 2024/0015755 | A1* | 1/2024 | Pan | H04W 72/25 |
| 2024/0314819 | A1* | 9/2024 | Miao | H04W 72/25 |

FOREIGN PATENT DOCUMENTS

| | | | |
|---|---|---|---|
| WO | 2015065130 | A1 | 5/2015 |
| WO | 2020011336 | A1 | 1/2020 |
| WO | 2022010410 | A1 | 1/2022 |
| WO | 2022086428 | A1 | 4/2022 |

OTHER PUBLICATIONS

Author Unknown, "Technical Specification Group Services and System Aspects; Architecture enhancements for 5G System (5GS) to support Vehicle-to-Everything (V2X) services (Release 16)," Technical Specification 23.287, Version 16.4.0, Sep. 2020, 3GPP Organizational Partners, 58 pages.

Author Unknown, "Technical Specification Group Services and System Aspects; Architecture enhancements for 5G System (5GS) to support Vehicle-to-Everything (V2X) services (Release 17)," Technical Specification 23.287, Version 17.0.0, Jun. 2021, 3GPP Organizational Partners, 59 pages.

Author Unknown, "Technical Specification Group Radio Access Network; NR; Physical channels and modulation (Release 16)," Technical Specification 38.211, Version 16.3.0, Sep. 2020, 3GPP Organizational Partners, 133 pages.

Author Unknown, "Technical Specification Group Radio Access Network; NR; Physical channels and modulation (Release 16)," Technical Specification 38.211, Version 16.6.0, Jun. 2021, 3GPP Organizational Partners, 134 pages.

Author Unknown, "Technical Specification Group Radio Access Network; NR; Multiplexing and channel coding (Release 16)," Technical Specification 38.212, Version 16.3.0, Sep. 2020, 3GPP Organizational Partners, 152 pages.

Author Unknown, "Technical Specification Group Radio Access Network; NR; Multiplexing and channel coding (Release 16)," Technical Specification 38.212, Version 16.6.0, Jun. 2021, 3GPP Organizational Partners, 153 pages.

Author Unknown, "Technical Specification Group Radio Access Network; NR; Physical layer procedures for control (Release 16)," Technical Specification 38.213, Version 16.3.0, Sep. 2020, 3GPP Organizational Partners, 179 pages.

Author Unknown, "Technical Specification Group Radio Access Network; NR; Physical layer procedures for control (Release 16)," Technical Specification 38.213, Version 16.6.0, Jun. 2021, 3GPP Organizational Partners, 187 pages.

Author Unknown, "Technical Specification Group Radio Access Network; NR; Physical layer procedures for data (Release 16)," Technical Specification 38.214, Version 16.1.0, Mar. 2020, 3GPP Organizational Partners, 151 pages.

Author Unknown, "Technical Specification Group Radio Access Network; NR; Physical layer procedures for data (Release 16)," Technical Specification 38.214, Version 16.3.0, Sep. 2020, 3GPP Organizational Partners, 166 pages.

Author Unknown, "Technical Specification Group Radio Access Network; NR; Medium Access Control (MAC) protocol specification (Release 16)," Technical Specification 38.321, Version 16.2.0, Sep. 2020, 3GPP Organizational Partners, 154 pages.

Author Unknown, "Technical Specification Group Radio Access Network; NR; Medium Access Control (MAC) protocol specification (Release 16)," Technical Specification 38.321, Version 16.4.0, Mar. 2021, 3GPP Organizational Partners, 157 pages.

Author Unknown, "Technical Specification Group Radio Access Network; NR; Radio Resource Control (RRC) protocol specification (Release 16)," Technical Specification 38.331, Version 16.1.0, Jul. 2020, 3GPP Organizational Partners, 906 pages.

Author Unknown, "Technical Specification Group Radio Access Network; NR; Radio Resource Control (RRC) protocol specification (Release 16)," Technical Specification 38.331, Version 16.2.0, Sep. 2020, 3GPP Organizational Partners, 921 pages.

Author Unknown, "Technical Specification Group Radio Access Network; NR; Radio Resource Control (RRC) protocol specification (Release 16)," Technical Specification 38.331, Version 16.4.1, Mar. 2021, 3GPP Organizational Partners, 949 pages.

CAICT, "R1-2104725: Considerations on mode2 enhancements," 3GPP TSG RAN WG1 Meeting #105e, May 10-27, 2021, Electronic Meeting, 4 pages.

CAICT, "R1-2109349: Considerations on mode2 enhancements," 3GPP TSG RAN WG1 Meeting #106b-e, Oct. 11-19, 2021, Electronic Meeting, 8 pages.

CATT, et al., "R1-2100352: Discussion on feasibility and benefits for mode 2 enhancements," 3GPP TSG RAN WG1 meeting #104-e, Jan. 25-Feb. 5, 2021, Electronic Meeting, 9 pages.

CATT, et al., "R1-2104490: Discussion on inter-UE coordination for Mode 2 enhancements," 3GPP TSG RAN WG1 meeting #105-e, May 19-27, 2021, Electronic Meeting, 7 pages.

Ericsson, "R1-2103705: Mode 2 enhancements using Inter-UE coordination," 3GPP TSG RAN WG1 #104b-e, Apr. 12-20, 2021, Electronic Meeting, 15 pages.

LG Electronics, "RP-193231: New WID on NR sidelink enhancement," 3GPP TSG RAN Meeting #86, Dec. 9-12, 2019, Sitges, Spain, 6 pages.

LG Electronics, "RP-202846: WID revision: NR sidelink enhancement," 3GPP TSG RAN Meeting #90e, Dec. 7-11, 2020, Electronic Meeting, 6 pages.

VIVO, "R1-2106200: Discussion on mode 2 enhancements," 3GPP TSG RAN WG1 #105-e, May 10-27, 2021, Electronic Meeting, 11 pages.

International Search Report and Written Opinion for International Patent Application No. PCT/SE2021/051065, mailed Dec. 2, 2021, 12 pages.

International Search Report and Written Opinion for International Patent Application No. PCT/SE2021/050710, mailed Nov. 5, 2021, 10 pages.

International Search Report and Written Opinion for International Patent Application No. PCT/SE2022/050741, mailed Oct. 5, 2022, 11 pages.

Fraunhofer, et al., "R1-2104561: Resource Allocation Enhancements for Mode 2," 3GPP TSG RAN WG1 Meeting #105-e, May 10-27, 2021, Electronic Meeting, 16 pages.

Extended European Search Report for European Patent Application No. 22853602.5, mailed May 19, 2025, 10 pages.

* cited by examiner

SIDELINK COORDINATION BETWEEN A TRANSMITTING DEVICE AND A RECEIVING DEVICE

This application is a 35 U.S.C. § 371 national phase filing of International Application No. PCT/SE2022/050741, filed Aug. 5, 2022, which claims the benefit of provisional patent application Ser. No. 63/229,829, filed Aug. 5, 2021, the disclosures of which are incorporated herein by reference in their entireties.

TECHNICAL FIELD

The present disclosure relates to request of coordination messages. More particularly, it relates to a transmitting wireless device, a receiving wireless device and methods for enabling coordination between the transmitting wireless device and the receiving wireless device.

BACKGROUND

3GPP Work on Sidelink (SL)

Third Generation Partnership Project (3GPP) specified support in Long Term Evolution (LTE) for Proximity Services (ProSe) in Releases 12 and 13, targeting public safety use cases (e.g., first responders) as well as a small subset of commercial use cases (e.g., discovery). The main novelty of ProSe was the introduction of Device-to-Device (D2D) communications using the SL interface. During Rel-14 and Rel-15 in 3GPP, major changes were introduced to the LTE SL framework with the aim of supporting Vehicle-to-Everything/Anything (V2X) communications, where V2X collectively denotes communication between a vehicle to any other endpoint (e.g., a vehicle, a pedestrian, etc.). The feature targeted mostly basic V2X use cases such as day-1 safety, etc.

During Rel-16, 3GPP worked on specifying the SL interface for the 5G New Radio (NR). The NR SL in Rel-16 mainly targets advanced V2X services, which can be categorized into four use case groups: vehicles platooning, extended sensors, advanced driving and remote driving. The advanced V2X services require a new SL in order to meet the stringent requirements in terms of latency and reliability. The NR SL is designed to provide higher system capacity and better coverage, and to allow for an easy extension to support the future development of further advanced V2X services and other related services.

Given the targeted V2X services by NR SL, it is commonly recognized that groupcast/multicast and unicast transmissions are desired, in which the intended receiver of a message consists of only a subset of the vehicles in proximity to the transmitter (groupcast) or of a single vehicle (unicast). For example, in the platooning service there are certain messages that are only of interest to the members of the platoon, making the members of the platoon a natural groupcast. In another example, the see-through use case most likely involves only a pair of vehicles, for which unicast transmissions naturally fit. Therefore, NR SL not only supports broadcast as in LTE SL, but also groupcast and unicast transmissions. Like in LTE SL, the NR SL is designed in such a way that its operation is possible with and without network coverage and with varying degrees of interaction between User Equipment (UEs) and a Network (NW), including support for standalone, network-less operation.

In Rel-17, 3GPP is working on multiple enhancements for the SL with the aim of extending the support for V2X and to cover other Use Cases (UCs) such as public safety (see RP-193231). Among these, improving the performance of power limited UEs (e.g., pedestrian UEs, first responder UEs, etc.) and improving the performance using resource coordination are considered critical.

Resource Allocation for SL Transmissions

Like in LTE SL, there are two resource allocation modes for NR SL:

- Network-based resource allocation, in which the network selects the resources and other transmit parameters used by SL UEs. In some cases, the network may control every single transmission parameter. In other cases, the network may select the resources used for transmission but may give the transmitter the freedom to select some of the transmission parameters, possibly with some restrictions. In the context of NR SL, 3GPP refers to this resource allocation mode as Mode 1.
- Autonomous resource allocation, in which the UEs autonomously select the resources and other transmit parameters. In this mode, there may be no intervention by the network (e.g., out of coverage, unlicensed carriers without a network deployment, etc.) or very minimal intervention by the network (e.g., configuration of pools of resources, etc.). In the context of NR SL, 3GPP refers to this resource allocation mode as Mode 2.

Mode 2 in NR SL

In SL transmission mode 2, distributed resource selection is employed, i.e., there is no central node for scheduling and UEs play the same role as in autonomous resource selection. Transmission Mode 2 is based on two functionalities: reservation of future resources and sensing-based resource allocation. Reservation of future resources is done so that the UE sending a message also notifies the receivers about its intention to transmit message using certain time-frequency resources at a later point in time. For example, a UE transmitting at time T informs the receivers that it will transmit using the same frequency resources at time T+100 ms. Resource reservation allows a UE to predict the utilization of the radio resources in the future. That is, by listening to the current transmissions of another UE, it also obtains information about potential future transmissions. This information can be used by the UE to avoid collisions when selecting its own resources. Every UE sends a message that is received by every other UE indicating the resources to be used by the further messages. Specifically, a UE predicts the future utilization of the radio resources by reading received booking messages (e.g., information about the reserved resources for future messages) and then schedules its current transmission to avoid using the same resources. This is known as sensing-based resource selection.

The sensing-based resource selection scheme specified in NR Rel-16 can be roughly summarized in the following steps and is defined in the specification TS 38.214 (v16.1.0).

a) A UE senses the transmission medium during an interval [n−a, n−b], where n is a time reference, and a>b≥0 define the duration of the sensing window. The length of the sensing window is (pre-)configurable.
b) Based on the sensing results, the UE predicts the future utilization of the transmission medium at a future time interval [n+T1, n+T2], where T2>T1≥0. The interval [n+T1, n+T2] is the resource selection window.
c) The UE selects one or more time-frequency resources among the resources in the selection window [n+T1, n+T2] that are predicted/determined to be selectable (e.g., idle, usable, available, etc.).

Table 1 includes the text of the NR Rel-16 specification that is related to sensing and selection windows. More specifically,

- The sensing window is explicitly defined in Step 2 in Table 1.

The resource selection window corresponds to the time interval [n+T1, n+T2], as described in Step 1 in Table 1.

TABLE 1

| Rel. 16 Specification related to Resource Selection in NR mode-2 |
|---|
| 8.1.4 UE procedure for determining the subset of resources to be reported to higher layers in PSSCH resource selection in sidelink resource allocation mode 2<br>In resource allocation mode 2, the higher layer can request the UE to determine a subset of resources from which the higher layer will select resources for PSSCH/PSCCH transmission. To trigger this procedure, in slot n, the higher layer provides the following parameters for this PSSCH/PSCCH transmission:<br>the resource pool from which the resources are to be reported;<br>L1 priority, $prio_{TX}$;<br>the remaining packet delay budget;<br>the number of sub-channels to be used for the PSSCH/PSCCH transmission in a slot, $L_{subCH}$;<br>optionally, the resource reservation interval, $P_{rsvp\_TX}$, in units of ms.<br>if the higher layer requests the UE to determine a subset of resources from which the higher layer will select resources for PSSCH/PSCCH transmission as part of re-evaluation or pre-emption procedure, the higher layer provides a set of resources $(r_0, r_1, r_2, \ldots)$ which may be subject to re-evaluation and a set of resources $(r'_0, r'_1, r'_2, \ldots)$ which may be subject to pre-emption.<br>it is up to UE implementation to determine the subset of resources as requested by higher layers before or after the slot $r''_i - T_3$, where $r''_i$ is the slot with the smallest slot index among $(r_0, r_1, r_2, \ldots)$ and $(r'_0, r'_1, r'_2, \ldots)$, and $T_3$ is equal to $T^{SL}_{proc,1}$, where $T^{SL}_{proc,1}$ is defined in slots in Table 8.1.4-2 where $\mu_{SL}$ is the SCS configuration of the SL BWP.<br>The following higher layer parameters affect this procedure:<br>t2min_SelectionWindow: internal parameter $T_{2min}$ is set to the corresponding value from higher layer parameter t2min_SelectionWindow for the given value of $prio_{TX}$.<br>SL-ThresRSRP_pi_pj: this higher layer parameter provides an RSRP threshold for each combination $(p_i, p_j)$, where $p_i$ is the value of the priority field in a received SCI format 1-A and $p_j$ is the priority of the transmission of the UE selecting resources; for a given invocation of this procedure, $p_j = prio_{TX}$.<br>RSforSensing selects if the UE uses the PSSCH-RSRP or PSCCH-RSRP measurement, as defined in clause 8.4.2.1.<br>sl-ResourceReservePeriodList<br>t0_SensingWindow. internal parameter $T_0$ is defined as the number of slots corresponding to t0_SensingWindow ms.<br>sl-xPercentage: internal parameter X for a given $prio_{TX}$ is defined as sl-xPercentage($prio_{TX}$) converted from percentage to ratio<br>p_preemption: internal parameter $prio_{pre}$ is set to the higher layer provided parameter p_preemption<br>The resource reservation interval, $P_{rsvp\_TX}$, if provided, is converted from units of ms to units of logical slots, resulting in $P'_{rsvp\_TX}$ according to clause 8.1.7.<br>Notation:<br>$\left(t^{SL}_0, t^{SL}_1, t^{SL}_2, \ldots\right)$ denotes the set of slots which can belong to a sidelink resource pool and is defined in Clause 8.<br>The following steps are used:<br>1) A candidate single-slot resource for transmission $R_{x,y}$ is defined as a set of $L_{subCH}$ contiguous sub-channels with sub-channel $x+j$ in slot $t^{SL}_y$ where $j = 0, \ldots, L_{subCH} - 1$. The UE shall assume that any set of $L_{subCH}$ contiguous sub-channels included in the corresponding resource pool within the time interval $[n + T_1, n + T_2]$ correspond to one candidate single-slot resource, where<br>selection of $T_1$ is up to UE implementation under $0 \le T_1 \le T^{SL}_{proc,1}$, where $T^{SL}_{proc,1}$ is defined in slots in Table 8.1.4-2 where $\mu_{SL}$ is the SCS configuration of |

TABLE 1-continued

| Rel. 16 Specification related to Resource Selection in NR mode-2 |
|---|
| the SL BWP;<br>if $T_{2min}$ is shorter than the remaining packet delay budget (in slots) then $T_2$ is up to UE implementation subject to $T_{2min} \leq T_2 \leq$ remaining packet budget (in slots); otherwise $T_2$ is set to the remaining packet delay budget (in slots).<br>The total number of candidate single-slot resources is denoted by $M_{total}$.<br>2) The sensing window is defined by the range of slots $[n - T_0, n - T^{SL}_{proc,0})$ where $T_0$ is defined above and $T^{SL}_{proc,0}$ is defined in slots in Table 8.1.4-1 where $\mu_{SL}$ is the SCS configuration of the SL BWP. The UE shall monitor slots which can belong to a sidelink resource pool within the sensing window except for those in which its own transmissions occur. The UE shall perform the behaviour in the following steps based on PSCCH decoded and RSRP measured in these slots.<br>3) The internal parameter $Th(p_i)$ is set to the corresponding value from higher layer parameter SL-ThresRSRP_pi_pj for $p_j$ equal to the given value of $prio_{TX}$ and each priority value $p_i$.<br>4) The set $S_A$ is initialized to the set of all the candidate single-slot resources.<br>5) The UE shall exclude any candidate single-slot resource $R_{x,y}$ from the set $S_A$ if it meets all the following conditions:<br>the UE has not monitored slot $t^{SL}_m$ in Step 2.<br>for any periodicity value allowed by the higher layer parameter sl-ResourceReservePeriodList and a hypothetical SCI format 1-A received in slot $t^{SL}_m$ with "Resource reservation period" field set to that periodicity value and indicating all subchannels of the resource pool in this slot, condition c in step 6 would be met.<br>6) The UE shall exclude any candidate single-slot resource $R_{x,y}$ from the set $S_A$ if it meets all the following conditions:<br>a) the UE receives an SCI format 1-A in slot $t^{SL}_m$, and "Resource reservation period" field, if present, and "Priority" field in the received SCI format 1-A indicate the values $P_{rsvp\_RX}$ and $prio_{RX}$, respectively according to Clause 16.4 in [6, TS 38.213];<br>b) the RSRP measurement performed, according to clause 8.4.2.1 for the received SCI format 1-A, is higher than $Th(prio_{RX})$;<br>c) the SCI format received in slot $t^{SL}_m$ or the same SCI format which, if and only if the "Resource reservation period" field is present in the received SCI format 1-A, is assumed to be received in slot(s) $t^{SL}_{m+q\times P'_{rsvp\_RX}}$ determines according to clause 8.1.5 the set of resource blocks and slots which overlaps with $R_{x,y+j\times P'_{rsvp\_TX}}$ for $q = 1, 2, \ldots, Q$ and $j = 0, 1, \ldots, C_{resel} - 1$. Here, $P'_{rsvp\_RX}$ is $P_{rsvp\_RX}$ converted to units of logical slots according to clause 8.1.7, $Q = \left\lceil \frac{T_{scal}}{P_{rsvp\_RX}} \right\rceil$ if $P_{rsvp\_RX} < T_{scal}$ and $n' - m \leq P'_{rsvp\_RX}$, where $t^{SL}_{n'} = n$ if slot $n$ belongs to the set $(t^{SL}_0, t^{SL}_1, \ldots, t^{SL}_{T_{max}})$, otherwise slot $t^{SL}_{n'}$ is the first slot after slot $n$ belonging to the set $(t^{SL}_0, t^{SL}_1, \ldots, t^{SL}_{T_{max}})$; otherwise $Q = 1$. $T_{scal}$ is set to selection window size $T_2$ converted to units of ms.<br>7) If the number of candidate single-slot resources remaining in the set $S_A$ is smaller than $X \cdot M_{total}$, then $Th(p_i)$ is increased by 3 dB for each priority value $Th(p_i)$ and the procedure continues with step 4.<br>The UE shall report set $S_A$ to higher layers. |

Re-Evaluation and Pre-Emption Mechanism in NR SL Mode 2

The previous section described sensing-based resource allocation, which aims at predicting future utilization of the channel and selecting resources as to avoid collisions. However, collisions may be detected after the initial allocation of resources in the following two cases:

- After selecting a resource, but prior to performing any transmission (i.e., prior to reserving any of the selected resource), the UE may detect through sensing a potential collision affecting one of the selected resources. Note that initially, the selection of resources made by a UE is an internal decision, unknown to nearby UEs. At this point we say the resource is selected (but not reserved). After transmitting a reservation for a selected resource, the surrounding UEs become aware of this condition. At this point we say that the resource is reserved (or selected and reserved).
- After reserving a resource, a UE may sense a conflicting reservation transmitted by another UE. Which of the two reservations has precedence (if any) can be determined by looking at the priority associated with each of them. This information is signaled together with the reservation.

The specification defines two mechanisms to avoid collisions in the preceding two situations:

- Re-evaluation (and re-selection) for the case that a resource is selected but not reserved.
- Pre-emption (and re-selection) for the case that a resource is selected and reserved.

Herein, re-evaluation and pre-emption refer to the following.

Re-Evaluation

In the time between the selection of the resource(s) and the transmission of a corresponding reservation, other UEs may reserve the same resources. To avoid such a collision, a UE is allowed to re-consider its selection. The purpose of such procedure is to evaluate if the earlier selected resource (s) is still suitable for transmission or not. If a UE determines that the earlier selected resource(s) is (are) not suitable for its own transmission anymore (e.g., some other UE also selected the same resource in the meantime), it triggers the resource selection mechanism again. Meaning, a new set of candidate resources is created, and the resource(s) is(are) randomly selected from the newly created candidate resource set. This procedure is referred to as re-evaluation or re-evaluation and re-selection.

Pre-Emption

After a reservation has been sent, the UE cannot re-evaluate its selection anymore. However, it may still be prevented to transmit if other UEs have higher importance transmissions to perform. In these mechanisms, known as pre-emption, a UE (re-)triggers the resource selection if another UE with higher priority selects the same resource for its transmission. In this case, a UE with low priority transmission (re-)triggers resource selection and a new set of candidate resource set is created/determined by the UE based on the recent sensing information. This procedure is referred to as pre-emption or pre-emption and re-selection.

SL Control Information (SCI)

For SL transmission, each packet transmitted via Physical Sidelink Shared Channel (PSSCH) is associated with an SCI via Physical Sidelink Control Channel (PSCCH). The SCI is divided into two stages:

- The first stage is contained within the PSCCH and contains the following information as taken from the specification document 38.212 section 8.3.1:
  - Priority—3 bits as specified in clause 5.4.3.3 of [12, TS 23.287] and clause 5.22.1.3.1 of [8, TS 38.321].
  - Frequency resource assignment—

$$\left\lceil \log_2\left(\frac{N^{SL}_{subChannel}\left(N^{SL}_{subChannel}+1\right)}{2}\right)\right\rceil$$

bits when the value of the higher layer parameter sl-MaxNumPerReserve is configured to 2; otherwise $$\left\lceil \log_2\left(\frac{N^{SL}_{subChannel}\left(N^{SL}_{subChannel}+1\right)\left(2N^{SL}_{subChannel}+1\right)}{6}\right)\right\rceil$$

bits when the value of the higher layer parameter sl-MaxNumPerReserve is configured to 3, as defined in clause 8.1.5 of [6, TS 38.214].
  - Time resource assignment—5 bits when the value of the higher layer parameter sl-MaxNumPerReserve is configured to 2; otherwise, 9 bits when the value of the higher layer parameter sl-MaxNumPerReserve is configured to 3, as defined in clause 8.1.5 of [6, TS 38.214].
  - Resource reservation period—$\lceil \log_2 N_{rsv\_period} \rceil$ bits as defined in clause 16.4 of [5, TS 38.213], where $N_{rsv\_period}$ is the number of entries in the higher layer parameter sl-ResourceReservePeriodList, if higher layer parameter sl-MultiReserveResource is configured; 0 bit otherwise.
  - DMRS pattern—$\lceil \log_2 N_{pattern} \rceil$ bits as defined in clause 8.4.1.1.2 of [4, TS 38.211], where $N_{pattern}$ is the number of DMRS patterns configured by higher layer parameter sl-PSSCH-DMRS-TimePatternList.
  - $2^{nd}$-stage SCI format—2 bits as defined in Table 8.3.1.1-1.
  - Beta_offset indicator—2 bits as provided by higher layer parameter sl-BetaOffsets2ndSCI and Table 8.3.1.1-2.
  - Number of DMRS port—1 bit as defined in Table 8.3.1.1-3.
  - Modulation and coding scheme—5 bits as defined in clause 8.1.3 of [6, TS 38.214].
  - Additional MCS table indicator—as defined in clause 8.1.3.1 of [6, TS 38.214]: 1 bit if one MCS table is configured by higher layer parameter sl-Additional-MCS-Table; 2 bits if two MCS tables are configured by higher layer parameter sl-Additional-MCS-Table; 0 bit otherwise.
  - PSFCH overhead indication—1 bit as defined clause 8.1.3.2 of [6, TS 38.214] if higher layer parameter sl-PSFCH-Period=2 or 4; 0 bit otherwise.
  - Reserved—a number of bits as determined by higher layer parameter sl-NumReservedBits, with value set to zero.
- The second stage is contained within the PSSCH and contains the following information for each different format as taken from the specification document 38.212 section 8.4.1.1 and 8.4.1.2:
  - The following information is transmitted by means of the SCI format 2-A:
    - HARQ process number—4 bits.
    - New data indicator—1 bit.
    - Redundancy version—2 bits as defined in Table 7.3.1.1.1-2.

Source ID—8 bits as defined in clause 8.1 of [6, TS 38.214].

Destination ID—16 bits as defined in clause 8.1 of [6, TS 38.214].

HARQ feedback enabled/disabled indicator—1 bit as defined in clause 16.3 of [5, TS 38.213].

Cast type indicator—2 bits as defined in Table 8.4.1.1-1 and in clause 8.1 of [6, TS 38.214].

CSI request—1 bit as defined in clause 8.2.1 of [6, TS 38.214] and in clause 8.1 of [6, TS 38.214].

The following information is transmitted by means of the SCI format 2-B:

HARQ process number—4 bits.

New data indicator—1 bit.

Redundancy version—2 bits as defined in Table 7.3.1.1.1-2.

Source ID—8 bits as defined in clause 8.1 of [6, TS 38.214].

Destination ID—16 bits as defined in clause 8.1 of [6, TS 38.214].

HARQ feedback enabled/disabled indicator—1 bit as defined in clause 16.3 of [5, TS 38.213].

Zone ID—12 bits as defined in clause 5.8.11 of [9, TS 38.331].

Communication range requirement—4 bits determined by higher layer parameter sl-ZoneConfigMCR-Index.

Inter-UE Coordination Mechanism

In Rel-17, 3GPP is working on multiple enhancements for sidelink with the aim of extending the support for V2X and to cover other Use Cases (UCs) such as public safety (see RP-202846). Among these, improving the performance of power limited UEs (e.g., pedestrian UEs, first responder UEs, etc.) and enhancing the performance using resource coordination are considered critical. Table 2 includes the objective in the work item description for SL enhancement that is relevant for this disclosure (marked as underlined).

TABLE 2

| Relevant objective in the Rel-17 work item on sidelink enhancements. |
|---|
| 2. Resource allocation enhancement:<br>[...]<br>Study the feasibility and benefit of solution(s) on the enhancement(s) in mode 2 for enhanced reliability and reduced latency in consideration of both PRR and PIR defined in TR37.885 (by RAN#91), and specify the identified solution(s) if deemed feasible and beneficial [RAN1, RAN2]<br>Inter-UE coordination with the following.<br>A set of resources is determined at UE-A. This set is sent to UE-B in mode 2, and UE-B takes this into account in the resource selection for its own transmission. |

Note:
The solution should be able to operate in-coverage, partial coverage, and out-of-coverage and to address consecutive packet loss in all coverage scenarios.

Specification of solutions is currently at an early stage. So far only a few agreements regarding general considerations have been made. The most relevant ones are captured in Table 3.

TABLE 3

| Early agreements on inter-UE coordination schemes |
|---|
| Agreement:<br>Support the following schemes of inter-UE coordination in Mode 2:<br>Inter-UE Coordination Scheme 1:<br>The coordination information sent from UE-A to UE-B is the set of resources preferred and/or non-preferred for UE-B's transmission<br>FFS details including a possibility of down-selection between the preferred resource set and the non-preferred resource set, whether or not to include any additional information other than indicating time/frequency of the resources within the set in the coordination information<br>FFS condition(s) in which Scheme 1 is used<br>Inter-UE Coordination Scheme 2:<br>The coordination information sent from UE-A to UE-B is the presence of expected/potential and/or detected resource conflict on the resources indicated by UE-B's SCI<br>FFS details including a possibility of down-selection between the expected/potential conflict and the detected resource conflict<br>FFS condition(s) in which Scheme 2 is used<br>Agreement:<br>When UE-B receives the inter-UE coordination information from UE-A, consider at least one of the following options (with details FFS including possibly down-selecting/merging one or more of the options below, applicable scenario(s)/condition(s) for each option, UE behavior) for UE-B's to take it into account in the resource (re)-selection for its own transmission<br>For scheme 1:<br>Option 1-1: UE-B's resource(s) to be used for its transmission resource (re)-selection is based on both UE-B's sensing result (if available) and the received coordination information<br>Option 1-2: UE-B's resource(s) to be used for its transmission resource (re)-selection is based only on the received coordination information<br>Option 1-3: UE-B's resource(s) to be re-selected based on the received coordination information<br>Option 1-4: UE-B's resource(s) to be used for its transmission resource (re)-selection is based on the received coordination information<br>For scheme 2:<br>Option 2-1: UE-B can determine resource(s) to be re-selected based on the received coordination information<br>Option 2-2: UE-B can determine a necessity of retransmission based on the received coordination information |

Based on the discussions and the content related to the first agreement—marked as underlined—there is arguably a need to have a method/mechanism that allows for triggering each of the Inter-UE coordination schemes while at the same time allowing to have a fast/flexible switching between both depending on certain conditions.

SUMMARY

Consequently, there is a need for providing an improved method to dynamically request a coordination message for the different Inter-UE coordination mechanisms. The method proposed in the disclosure allows a flexible co-existence between Inter-UE Scheme 1 and Inter-UE Scheme 2. Extra signaling and/or overhead to the system is reduced.

According to a first aspect of the present disclosure, a method performed by a transmitting wireless device for enabling coordination with a receiving wireless device is provided. The method comprises transmitting a coordination message to the receiving wireless device that indicates whether coordination information is expected; and receiving, in response to the coordination message indicating that coordination information is expected, the coordination information from the receiving wireless device in accordance with a format indicated in the coordination message.

In some embodiments, the coordination message may comprise a Sidelink Control Information, SCI, that indicates whether the coordination information is expected.

In some embodiments, the SCI may comprise one or more reserved bits encoded as one of: 00 or 0000 to indicate that the coordination information is not expected; 01 or 0001 to indicate that 1-bit coordination information is expected to be sent in accordance with an Inter-User Equipment, UE, Coordination Scheme 2 format; 10 or 0010 to indicate that map-based coordination information is expected to be sent in accordance with an Inter-UE Coordination Scheme 1 format independently of whether a collision is expected; and 11 or 0011 to indicate that map-based coordination information is expected to be sent in accordance with the Inter-UE Coordination Scheme 1 format in case of the collision is expected.

In some embodiments, the SCI may comprise a field configured to indicate that the coordination information is expected.

In some embodiments, the method may further comprise determining (400, 600) that the receiving wireless device is within a distance where it is able to decode the SCI.

In some embodiments, the coordination message may indicate, based on one or more reserved bits in the SCI, that the coordination information is expected.

In some embodiments, the step of receiving the coordination information may further comprise, in response to the coordination message indicating that 1-bit coordination information is expected while Hybrid Automatic Repeat Request, HARQ, is enabled and a collision is expected, receiving the coordination information in accordance with an Inter-UE Coordination Scheme 2 format.

According to a second aspect of the present disclosure, a method performed by a receiving wireless device for enabling coordination with a transmitting wireless device is provided. The method comprises receiving, from the transmitting wireless device, a coordination message that indicates whether coordination information is expected; and transmitting, in response to the coordination message indicating that coordination information is expected, the coordination information to the transmitting wireless device in accordance with a format indicated in the coordination message.

In some embodiments, the coordination message may comprise a Sidelink Control Information, SCI, that indicates whether the coordination information is expected.

In some embodiments, the SCI may comprise one or more reserved bits encoded as one of: 00 or 0000 to indicate that the coordination information is not expected; 01 or 0001 to indicate that 1-bit coordination information is expected to be sent in accordance with an Inter-User Equipment, UE, Coordination Scheme 2 format; 10 or 0010 to indicate that map-based coordination information is expected to be sent in accordance with an Inter-UE Coordination Scheme 1 format independently of whether a collision is expected; and 11 or 0011 to indicate that map-based coordination information is expected to be sent in accordance with the Inter-UE Coordination Scheme 1 format in case of the collision is expected.

In some embodiments, the SCI may comprise a field configured to indicate that the coordination information is expected.

In some embodiments, the step of transmitting the coordination information may comprise determining, based on one or more reserved bits in the SCI, that the coordination information is expected.

In some embodiments, the step of transmitting the coordination information may further comprise one of: transmitting 1-bit coordination information in accordance with the Inter-UE Coordination Scheme 2 format when the one or more reserved bits are encoded as 01 or 0001 and Hybrid Automatic Repeat Request, HARQ, is enabled; and not transmitting the coordination information when the one or more reserved bits are encoded as 01 or 0001 or the HARQ feedback is disabled.

In some embodiments, the step of transmitting the coordination information may further comprise determining, based on a time/frequency field in the SCI, whether the collision is expected when the one or more reserved bits are encoded as 11 or 0011.

In some embodiments, the step of transmitting the coordination information may further comprise not transmitting the coordination information when the one or more reserved bits are encoded as 10, 0010, 11, or 0011 and the collision is not expected.

In some embodiments, the step of transmitting the coordination information may further comprise transmitting the coordination information in accordance with the Inter-UE Coordination Scheme 1 format when the one or more reserved bits are encoded as 10, 0010, 11, or 0011 and the collision is expected.

In some embodiments, the step of transmitting the coordination information may further comprise, in response to the coordination message indicating that 1-bit coordination information is expected while Hybrid Automatic Repeat Request, HARQ, is enabled and a collision is expected, transmitting the coordination information in accordance with an Inter-UE Coordination Scheme 2 format.

According to a third aspect of the present disclosure, a wireless device for enabling coordination with a receiving wireless device is provided. The wireless device is configured to: transmit a coordination message to the receiving wireless device that indicates whether coordination information is expected; and receive, in response to the coordination message indicating that coordination information is expected, the coordination information from the receiving wireless device in accordance with a format indicated in the coordination message.

According to a fourth aspect of the present disclosure, a wireless device for enabling coordination with a transmitting wireless device is provided. The wireless device is configured to: receive, from the transmitting wireless device (1000-A), a coordination message that indicates whether a coordination information is expected; and transmit, in response to the coordination message indicating that coordination information is expected, the coordination information to the transmitting wireless device in accordance with a format indicated in the coordination message.

BRIEF DESCRIPTION OF THE DRAWINGS

Embodiments of the invention will be described in more detail hereinafter with reference to examples but to which the scope is not limited.

DETAILED DESCRIPTION SUMMARY

Figure 1:
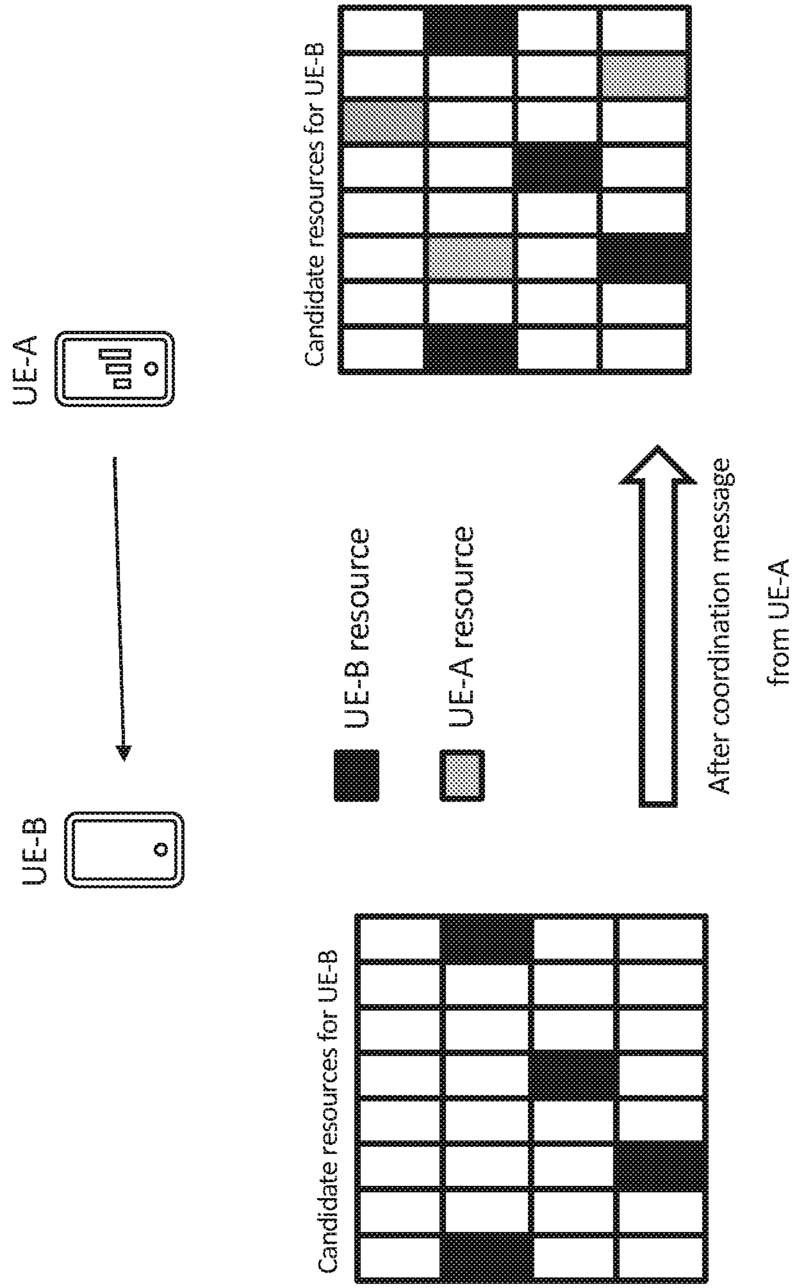
FIG. 1 illustrates an example of Scheme 1 for inter-UE coordination.

In this disclosure methods which involve both schemes (Scheme 1 and Scheme 2) as defined per the agreement(s) are discussed. In FIG. 1, an example of Scheme 1 for inter-UE coordination is displayed where UE-A sends an Inter-UE Coordination (IUC) message containing a set of preferred resources to be taken into consideration by UE-B for its next transmission.

Figure 2:
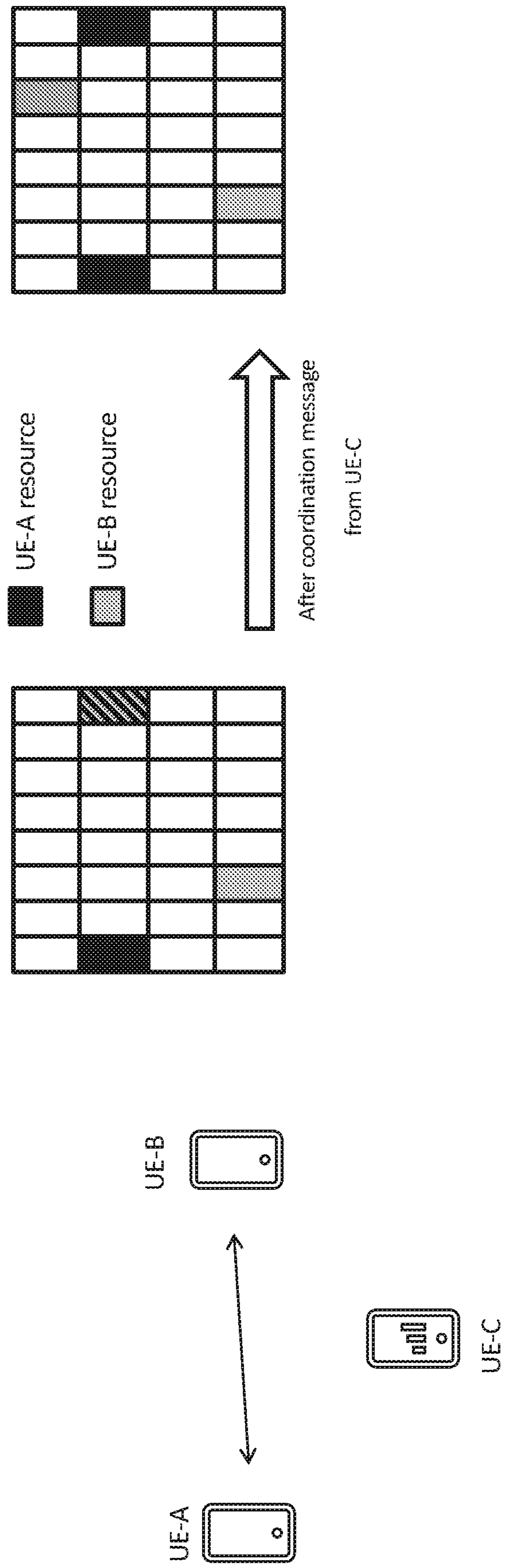
FIG. 2 illustrates an example of Scheme 2 for inter-UE coordination.

Moreover, FIG. 2 depicts the procedure for Scheme 2. An exemplary situation where Inter-UE Coordination Scheme 2 is used is given in the FIG. 2:

As shown in FIG. 2, there is a conflict between the reservation by UE-A and UE-B for the next transmission, i.e., they both selected the same resources unaware of each other's selection. Since UE-C is monitoring/sensing the resource pool, it is able to detect this future collision by reading the information in the SCI, and therefore, it sends a coordination message to UE-B in order to enable UE-B to perform re-selection of its resources.

There currently exists a certain challenge(s). In the current 3GPP Rel-17, there have been discussions regarding the signaling to request coordination information within the Inter-UE coordination procedure. Some of the options involve sending a separate enquiry/request message which is slow and introduces a heavy signaling overhead while other solutions do not include an explicit signaling, e.g., triggering due to potential collisions.

Moreover, an independent explicit enquiry/request message is mostly designed for Inter-UE Scheme 1 as defined in the above, while for Inter-UE Scheme 2 there is no discussion/solution to include such a request message in order to trigger the Inter-UE coordination mechanism. The issue for Inter-UE Scheme 2 when there is no request/enquiry message within the Inter-UE coordination procedure is that in case a UE reserves resources for its next transmission which creates conflicting resources, i.e., a collision is expected due to the same frequency/time resources reserved by several UEs, then the UE may receive a coordination message and one or more of the following may happen:

- The UE will not make use of it, i.e., will not follow the information contained in the coordination message regardless of the information/condition.
- The UE is not able to decode it, e.g., a Rel-16 UE.
- The UE is not expecting it, e.g., a UE which is in power saving mode, so its SL Rx chains are off, and therefore, the coordination message will not be received.

Therefore, under these situations it is not optimal that the coordinator UE, i.e., the UE that sends the coordination information, sends information since it just adds more overhead to the system without any benefit since the other UE(s) will not receive it; or are not able to decode it; or will not use it.

Another issue is that using an explicit request/enquiry signaling, makes it is too cumbersome to have a flexible/fast co-existence between the two schemes, e.g., changing the inter-UE coordination schemes between consecutive transmissions. Therefore, a way to have a more flexible and simpler way without adding extra signaling is needed.

Certain aspects of the present disclosure and their embodiments may provide solutions to the aforementioned or other challenges. In this disclosure, a mechanism to dynamically request a coordination message for the different Inter-UE coordination mechanisms, i.e., Inter-UE Scheme 1 and Inter-UE Scheme 2 per agreements, is defined. The mechanism is flexible and dynamic since it can signal to the peer UE(s) to use either Scheme 1 (i.e. map-based coordination); or Scheme 2 (i.e. one-bit coordination); or no inter-UE coordination mechanism at all for each transmission by using the 1st stage SCI, e.g., using the (pre-) configured reserved bits field. Moreover, upon receiving the request for a coordination message within the SCI, the receiving UE sends the coordination message (if any) in the desired format when certain conditions are fulfilled.

The main aspects of this disclosure are:

Dynamic/flexible method to request coordination information from peer UE(s).

Method that allows co-existence between Inter-UE Scheme 1 and Inter-UE Scheme 2.

Coordination information request included within the Sidelink Control Information (SCI) avoiding extra signaling and/or overhead.

There are, proposed herein, various embodiments which address one or more of the issues disclosed herein. In embodiments disclosed herein, coordination may be enabled between a transmitting wireless device and a receiving wireless device.

In one aspect, a method performed by the transmitting wireless device for enabling coordination is provided. The method includes transmitting a coordination message to the receiving device to indicate whether coordination information is expected.

In another aspect, a method performed by the receiving wireless device is provided. The method includes receiving a coordination message from the transmitting wireless device that indicates whether a coordination information is expected. The method also includes transmitting the coordination information to the transmitting wireless device in response to the coordination message indicating that the coordination information is expected.

Certain embodiments may provide one or more of the following technical advantage(s). The main advantages of the disclosed method are:

Allows for a dynamic and flexible co-existence between Scheme 1 and Scheme 2 for the inter-UE coordination procedure.

Additionally, the method described in this invention is compatible with legacy UEs, i.e., UEs without knowledge or capability associated to the inter-UE coordination procedures and legacy procedures/signaling making the procedure easy to be implemented.

No extra signaling is needed to request IUC message and/or to change between the different types.

No extra capability signaling exchange is needed for inter-UE coordination mechanism, i.e., there is no need to have exchange of capability for inter-UE coordination.

In the case of Scheme 2, only UEs which have actively requested to receive coordination information may receive it. In contrast to sending the coordination information every time a collision is detected for Scheme 2.

In case there is a coordinator UE, i.e., a UE which only function is to send coordination information, for instance a RoadSide Unit (RSU), it does not need to check the 2nd stage SCI every time a conflict is detected since only if there is a request within the 1st stage SCI the coordinator UE needs to know the source UE.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states. In some embodiments, a TRP may be a part of the gNB transmitting and receiving radio signals to/from UE according to physical layer properties and parameters inherent to that element. In some embodiments, in Multiple TRP (multi-TRP) operation, a serving cell can schedule UE from two TRPs, providing better Physical Downlink Shared Channel (PDSCH) coverage, reliability and/or data rates. There are two different operation modes for multi-TRP: single Downlink Control Information (DCI) and multi-DCI. For both modes, control of uplink and downlink operation is done by both physical layer and Medium Access Control (MAC). In single-DCI mode, UE is scheduled by the same DCI for both TRPs and in multi-DCI mode, UE is scheduled by independent DCIs from each TRP.

In some embodiments, a set Transmission Points (TPs) is a set of geographically co-located transmit antennas (e.g., an antenna array (with one or more antenna elements)) for one cell, part of one cell or one Positioning Reference Signal (PRS)-only TP. TPs can include base station (eNB) antennas, Remote Radio Heads (RRHs), a remote antenna of a base station, an antenna of a PRS-only TP, etc. One cell can be formed by one or multiple TPs. For a homogeneous deployment, each TP may correspond to one cell.

In some embodiments, a set of TRPs is a set of geographically co-located antennas (e.g., an antenna array (with one or more antenna elements)) supporting TP and/or Reception Point (RP) functionality.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 3:
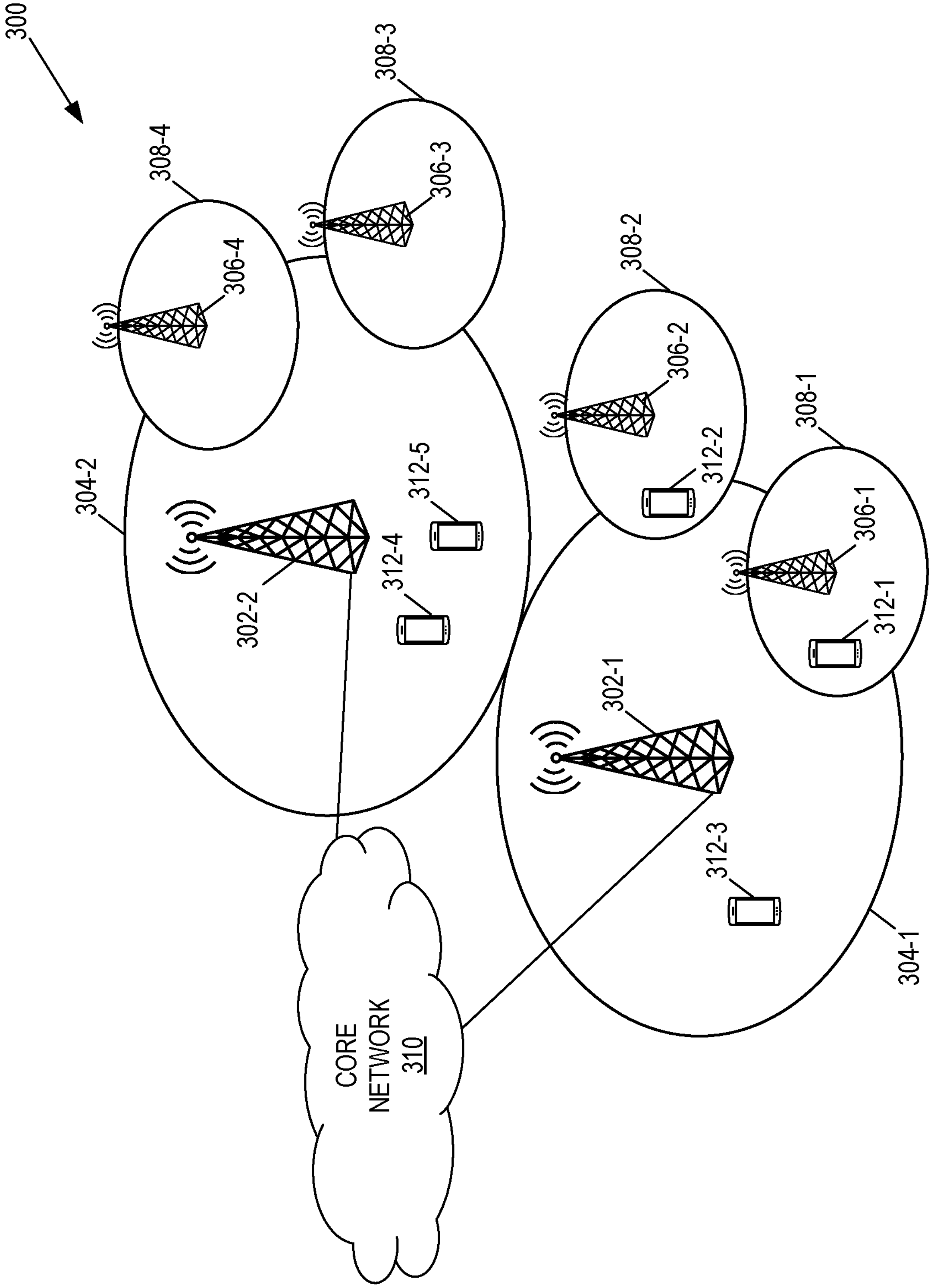
FIG. 3 illustrates one example of a cellular communications system 300 in which embodiments of the present disclosure may be implemented.

FIG. 3 illustrates one example of a cellular communications system 300 in which embodiments of the present disclosure may be implemented. In the embodiments described herein, the cellular communications system 300 is a 5G system (5GS) including a Next Generation RAN (NG-RAN) and a 5G Core (5GC). In this example, the RAN includes base stations 302-1 and 302-2, which in the 5GS include NR base stations (gNBs) and optionally next generation eNBs (ng-eNBs) (e.g., LTE RAN nodes connected to the 5GC), controlling corresponding (macro) cells 304-1 and 304-2. The base stations 302-1 and 302-2 are generally referred to herein collectively as base stations 302 and individually as base station 302. Likewise, the (macro) cells 304-1 and 304-2 are generally referred to herein collectively as (macro) cells 304 and individually as (macro) cell 304. The RAN may also include a number of low power nodes 306-1 through 306-4 controlling corresponding small cells 308-1 through 308-4. The low power nodes 306-1 through 306-4 can be small base stations (such as pico or femto base stations) or RRHs, or the like. Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The cellular communications system 300 also includes a core network 310, which in the 5G System (5GS) is referred to as the 5GC. The base stations 302 (and optionally the low power nodes 306) are connected to the core network 310.

The base stations 302 and the low power nodes 306 provide service to wireless communication devices 312-1 through 312-5 in the corresponding cells 304 and 308. The wireless communication devices 312-1 through 312-5 are generally referred to herein collectively as wireless communication devices 312 and individually as wireless communication device 312. In the following description, the wireless communication devices 312 are oftentimes UEs, but the present disclosure is not limited thereto.

As discussed in detail below, coordination can be performed between a pair of wireless devices. One of the wireless devices is a transmitting wireless device that requests coordination information. Another one of the wireless devices is a receiving wireless device that provides coordination information in response to the request from the transmitting wireless device.

The present invention is related to operations and methods using resource allocation Mode 2 or any other mode in which the UE(s) performs sensing and resource allocation.

Figure 4:
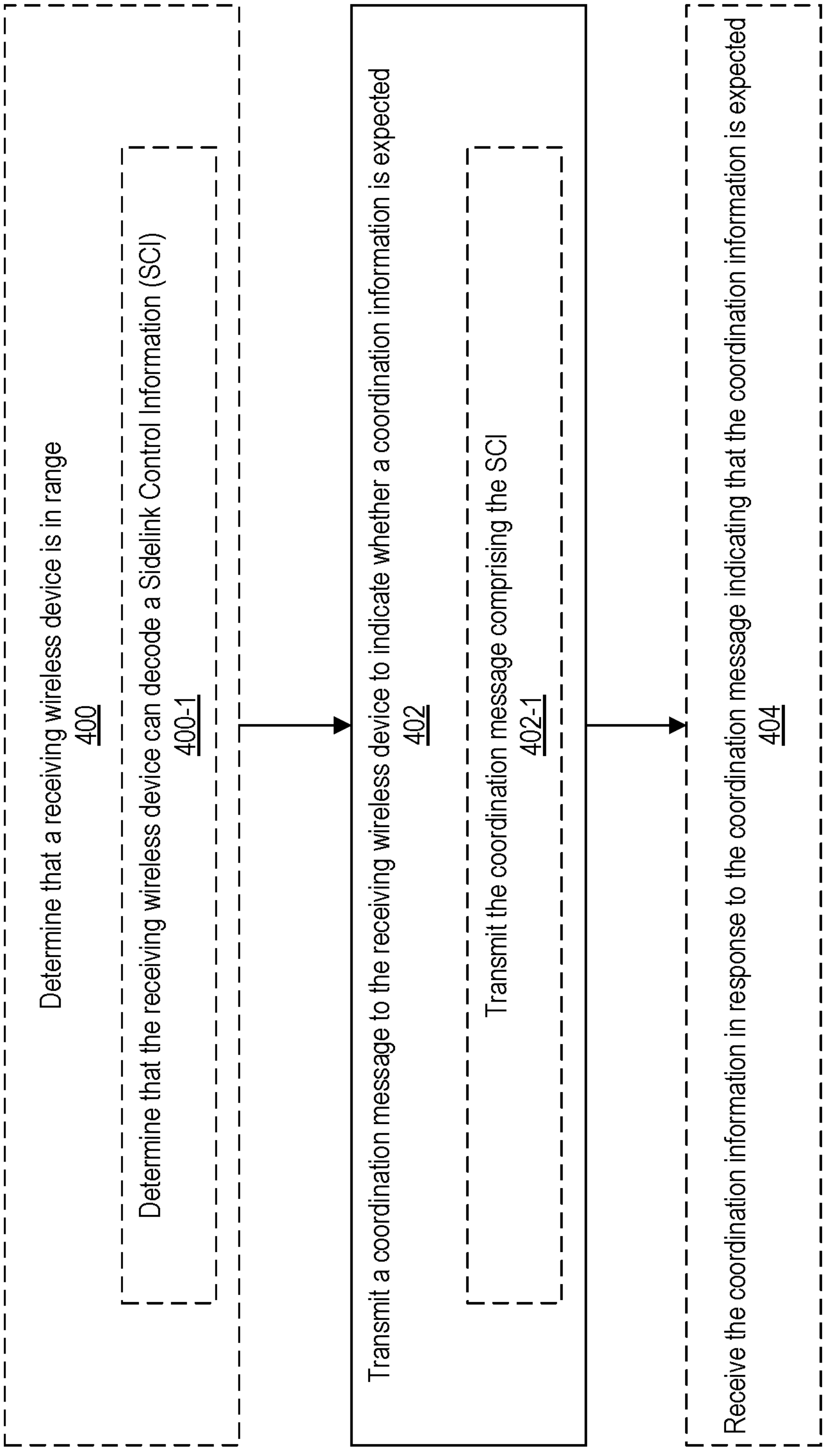
FIG. 4 illustrates a flowchart of an exemplary method performed by a transmitting wireless device for enabling coordination with a receiving wireless device.

FIG. 4 is a flowchart of an exemplary method performed by a transmitting wireless device for enabling coordination with a receiving wireless device. The transmitting wireless device may first determine that a receiving wireless device is in range (step 400). Specifically, the transmitting wireless device may determine whether the receiving wireless device is within a distance needed to be able to receive a message so that it can decode an SCI (step 400-1).

The transmitting wireless device transmits a coordination message to the receiving wireless device to indicate whether a coordination information is expected (step 402). In an embodiment, the coordination message can include the SCI (step 402-1). The transmitting wireless device may receive the coordination information in response to the coordination message indicating that the coordination information is expected (step 404).

Figure 5:
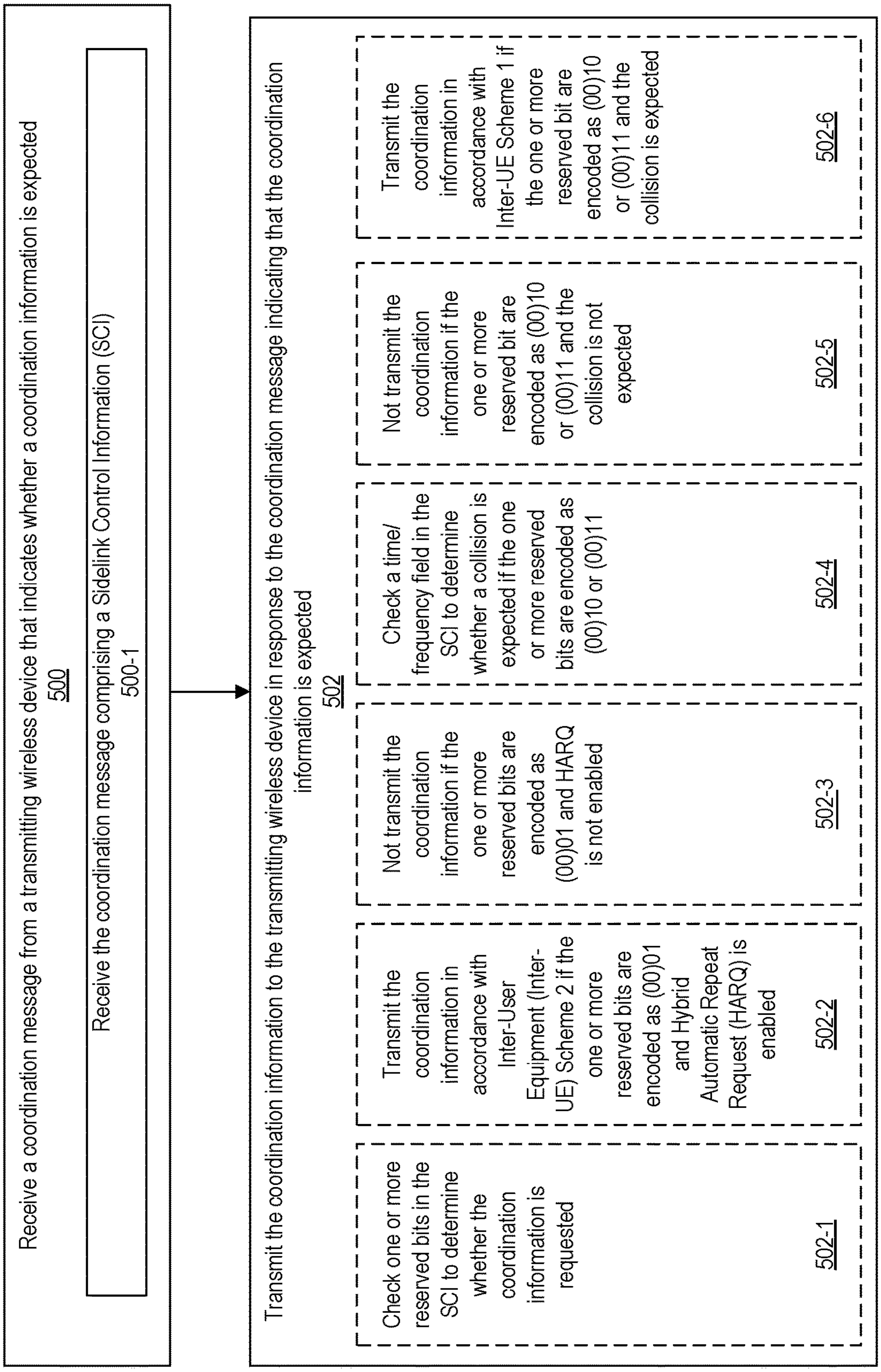
FIG. 5 illustrates a flowchart of an exemplary method performed by a receiving wireless device for enabling coordination with a transmitting wireless device.

FIG. 5 is a flowchart of an exemplary method performed by a receiving wireless device for enabling coordination with a transmitting wireless device. The receiving wireless device receives a coordination message from a transmitting wireless device that indicates whether a coordination information is expected (step 500). In an embodiment, the coordination message can include the SCI (step 500-1).

The receiving wireless device can transmit the coordination information to the transmitting wireless device in response to the coordination message indicating that the coordination information is expected (step 502). In one embodiment, the receiving wireless device may check one or more reserved bits in the SCI to determine whether the coordination information is requested (step 502-1). The receiving wireless device may transmit the coordination information in accordance with Inter-UE Scheme 2 if the reserved bits are encoded as (00)01 and Hybrid Automatic Repeat Request (HARQ) is enabled (step 502-2). The receiving wireless device may not transmit the coordination information if the reserved bits are encoded as (00)01 and HARQ is not enabled (step 502-3). The receiving wireless device may check a time/frequency field in the SCI to determine whether a collision is expected if the reserved bits are encoded as (00)01 or (00)11 (step 502-4). The receiving wireless device may not transmit the coordination information if the reserved bits are encoded as (00)10 or (00)11 and the collision is not expected (step 502-5). The receiving wireless device may transmit the coordination information in accordance with Inter-UE Scheme 1 if the reserved bits are encoded as (00)10 or (00)11 and the collision is expected (step 502-6).

This disclosure describes methods to request coordination information dynamically/flexibly in a number of formats (e.g., Scheme 1 or Scheme 2 as defined in Table 3). An indication/flag is included within the Sidelink (SL) Control Information (SCI) to signal the wanted/expected coordination information format (if any). By using the SCI to transport the request message, it is possible to avoid an extra signaling and overhead, and therefore, obtain a more dynamic and lean procedure to request coordination information.

The embodiment of the present disclosure is described in the context of 3GPP SL, where UEs (operating in either of the SL modes described earlier) communicate directly with each other, without sending the information through the base station. However, the solutions are applicable beyond SL as far as a UE can obtain a grant (e.g., by itself, from another node such as UE or a base station, etc.) and based on some information about the channel (e.g., acquired through sensing, transmitted from another node such as a UE or a base station, etc.) to determine whether none/some/all of the resources can be used and/or some other resources must be selected.

In the following, a UE requesting the coordination information will be denoted as UE-A, whereas the UE(s) receiving the request and transmitting the coordination information will be denoted as UE-B.

In this invention, UE-A requests to any UE-B in range, i.e., any UE that can decode the SCI transmitted by UE-A, to send a coordination information based on the information contained in its SCI. For instance, following the legacy NR SL specification, in the SCI there are reserved bits for forward compatibility (2-4 bits). Making use of these bits the procedure can be defined as follows:

The reserved bits in the 1st stage SCI are defined (or any combination thereof) as:

- (00)00: no coordination information is desired from UE-A perspective. This is the default mode and is compatible with Rel-16 SL UEs, i.e., a UE that is performing Rel-16 procedures will only use this configuration for the reserved bits.
- (00)01: UE-A is requesting to any UE(s) in range to send a coordination information using Scheme 2 format, i.e., one-bit coordination information. This configuration is used to increase the reliability of the communications, i.e., UE-A receives coordination information in case of a potential collision detected by other UEs (e.g., UE-B).
- (00)10: UE-A is requesting to any UE(s) in range to send a coordination information using Scheme 1 format, i.e., map-based coordination information. This configuration is used to optimize the resources selected/reserved by UE-A for its next transmission(s), i.e., not exclusively associated with a potential collision.
- (00)11: UE-A is requesting to any UE(s) in range to send a coordination information using Scheme 1 format, i.e., the map-based coordination information. This configuration is used to increase the reliability of the communications, i.e., UE-A receives coordination information in case of a potential collision.

Another possibility, in addition to the one stated above, is to define a new SCI format which includes an explicit field(s) to be used for requesting a coordination message in a specific format.

Therefore, based on the information contained in the 1st stage SCI, the receiving UE(s) will trigger a specific type (if any) of the inter-UE coordination schemes. It is noteworthy that in some of the potential combinations the inter-UE coordination is not only triggered due to the signaling within the 1st stage SCI, i.e., for instance 0001 or 0011, but it also requires that for instance a potential conflict is identified and/or HARQ feedback is enabled.

From any UE-B perspective, upon receiving/decoding the 1st stage SCI, the following steps are performed:

- UE-B checks the reserved bits information as defined above to thereby assess whether a coordination information is requested by UE-A and the desired format.
- Additionally, UE-B checks the time/frequency fields indicating the resources to be used by UE-A transmission (s) to determine whether a collision is expected.
  - In case a collision is expected, and the reserved bits are 0001 or 0011, a coordination information using Scheme 2, i.e., a one-bit coordination information, or using Scheme 1, i.e., a map-based coordination information, are transmitted respectively. Specifically, the coordination information using Scheme 2 is transmitted in a situation when HARQ is enabled.
  - In case a collision is expected, and the reserved bits are 0010, a coordination information using Scheme 1, i.e., a map-based coordination information, is transmitted.
  - In case a collision is not expected, and the reserved bits are 0001 or 0011, no coordination information is transmitted.
  - In case a collision is not expected, and the reserved bits are 0010, a coordination information using Scheme 1, i.e., a map-based coordination information, is transmitted.
- In case UE-A request a one-bit coordination information, i.e., Scheme 2, and the time/frequency fields included in SCI indicate that a potential collision may happen:
  - If HARQ feedback is enabled, i.e., information contained in 2nd stage SCI, then UE-B sends the coordination information in the requested format.
  - If HARQ feedback is disabled, i.e., information contained in 2nd stage SCI, then UE-B does not send any coordination information.

Figure 6:
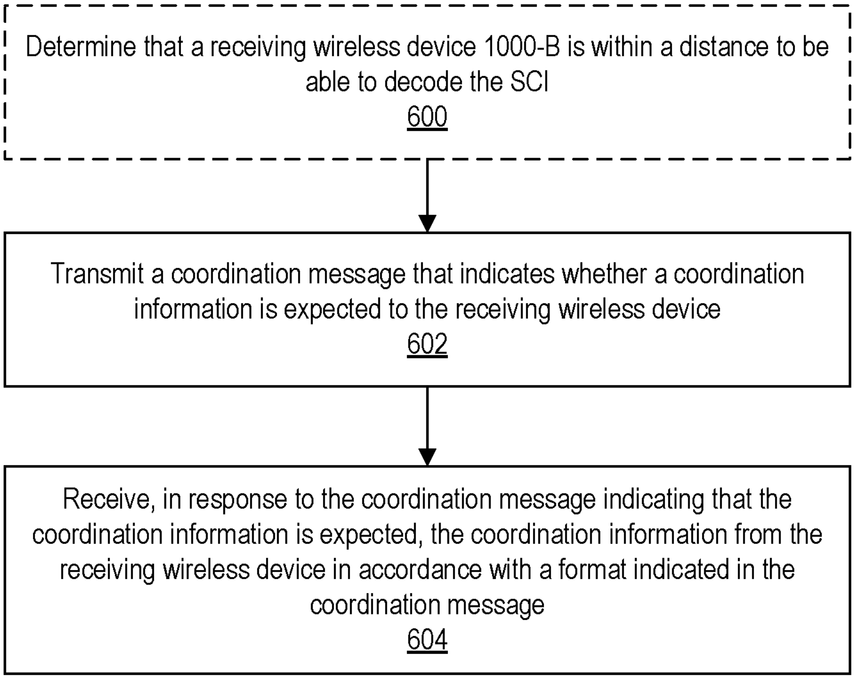
FIG. 6 illustrates a flowchart illustrating a method for enabling coordination with a receiving wireless device according to some embodiments of the present disclosure.

FIG. 6 is a flowchart illustrating a method for enabling coordination with a receiving wireless device (may be denoted as 1000-B) according to some embodiments of the present disclosure.

The method in FIG. 6 is performed by a transmitting wireless device (may be denoted as 1000-A). The transmitting wireless device 1000-A transmits a coordination message to the receiving wireless device 1000-B that indicates whether coordination information is expected from the receiving wireless device 1000-B (step 602).

The transmitting wireless device 1000-A receives, in response to the coordination message indicating that coordination information is expected, the coordination information from the receiving wireless device 1000-B in accordance with a format indicated in the coordination message (step 604).

In some examples, receiving (step 604) the coordination information further comprises, in response to the coordination message indicating that 1-bit coordination information is expected in a situation when Hybrid Automatic Repeat Request (HARQ) is enabled and a collision is expected, receiving the coordination information in accordance with an Inter-UE Coordination Scheme 2 format.

Optionally, the method in FIG. 6 may further comprise determining that the receiving wireless device 1000-B is within a distance where it is able to decode the SCI (step 600).

Figure 7:
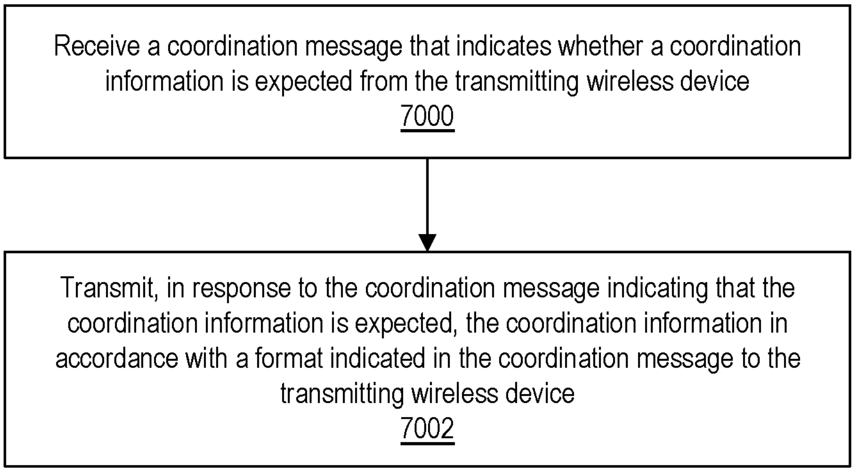
FIG. 7 illustrates a flowchart illustrating a method for enabling coordination with a transmitting wireless device according to some embodiments of the present disclosure.

FIG. 7 is a flowchart illustrating a method for enabling coordination with a transmitting wireless device 1000-A according to some embodiments of the present disclosure.

The method in FIG. 7 is performed by a receiving wireless device 1000-B. The receiving wireless device 1000-B receives a coordination message from the transmitting wireless device 1000-A that indicates whether a coordination information is expected from the receiving wireless device 1000-B (step 7000).

The receiving wireless device 1000-B transmits, in response to the coordination message indicating that coordination information is expected, the coordination information to the transmitting wireless device 1000-A in accordance with a format indicated in the coordination message (step 7002).

In some examples, transmitting (step 7002) the coordination information may comprise determining, based on one or more reserved bits in the SCI, that the coordination information is expected.

In further examples, transmitting (step 7002) the coordination information may further comprise determining, based on a time/frequency field in the SCI, whether the collision is expected when the one or more reserved bits are encoded as 11 or 0011.

Specifically, transmitting (step 7002) the coordination information may further comprise, in response to the coordination message indicating that 1-bit coordination information is expected in a situation when Hybrid Automatic Repeat Request (HARQ) is enabled and a collision is expected, transmitting the coordination information in accordance with an Inter-UE Coordination Scheme 2 format.

As an example, the coordination message described in the FIG. 6 and FIG. 7 may comprise a Sidelink Control Information (SCI) that indicates whether the coordination information is expected. In some examples, the SCI may comprise one or more reserved bits encoded as one of the code fields defined above. In other examples, the SCI may comprise a field configured to indicate that the coordination information is expected. For example, the coordination message may indicate that, based on one or more reserved bits in the SCI, the coordination information is expected.

In the main example, the SCI contains information that indicates whether coordination information for the associated transmission is requested (or not) and in case of requesting coordination information, it determines the format of the coordination information.

In a related example, the information regarding the coordination information within the SCI is included in the reserved bits.

In a related example, the information regarding the coordination information within the SCI spans between 2 and 4 bits of information.

In a related example, the information included in the reserved bits is defined as follows (or any combination thereof):

- (00)00: no coordination information is desired from UE-A perspective.
- (00)01: UE-A is requesting to any UE(s) in range to send a coordination information using Scheme 2, i.e., the one-bit coordination information.
- (00)10: UE-A is requesting to any UE(s) in range to send a coordination information using Scheme 1, i.e., the map-based coordination information.
- (00)11: UE-A is requesting to any UE(s) in range to send a coordination information using Scheme 1, i.e., the map-based coordination information.

In another example, a new SCI format is defined including a field that indicates whether coordination information for the associated transmission is requested (or not) and in case of requesting coordination information, it determines the format of the coordination information.

In another example, a UE upon receiving/decoding an SCI, which contains a field indicating whether a coordination information is needed and the desired format of the coordination information, transmits the coordination information in the indicated format if the conditions are fulfilled.

In a related example, for the case of one-bit coordination information required by UE-A, in addition to the information contained in the SCI, the UE decoding the SCI checks whether a potential collision is expected in order to send the coordination information.

In a related example, for the case of one-bit coordination information required by UE-A, the UE decoding the SCI checks whether a potential collision is expected and sends the coordination information only if HARQ feedback is enabled.

In a related example, for the case of map-based coordination information required by UE-A, in addition to the information contained in the SCI, the UE decoding the SCI checks whether a potential collision is expected and the exact format of the requested coordination information in order to send the coordination information.

In another example, a UE which is in a power saving mode, e.g., non-sensing prior to resource selection, upon sending the SCI with a request for a coordination information turns on its reception modules.

In a related example, a UE which is in a power saving mode and sends a request within the SCI to receive a one-bit coordination information, turns on its reception capabilities in order to receive Physical SL Feedback Channel (PSFCH) resources.

In a related example, a UE which is in a power saving mode and sends a request within the SCI to receive a map-based coordination information, turns on its reception capabilities fully in order to receive the coordination information.

Figure 8:
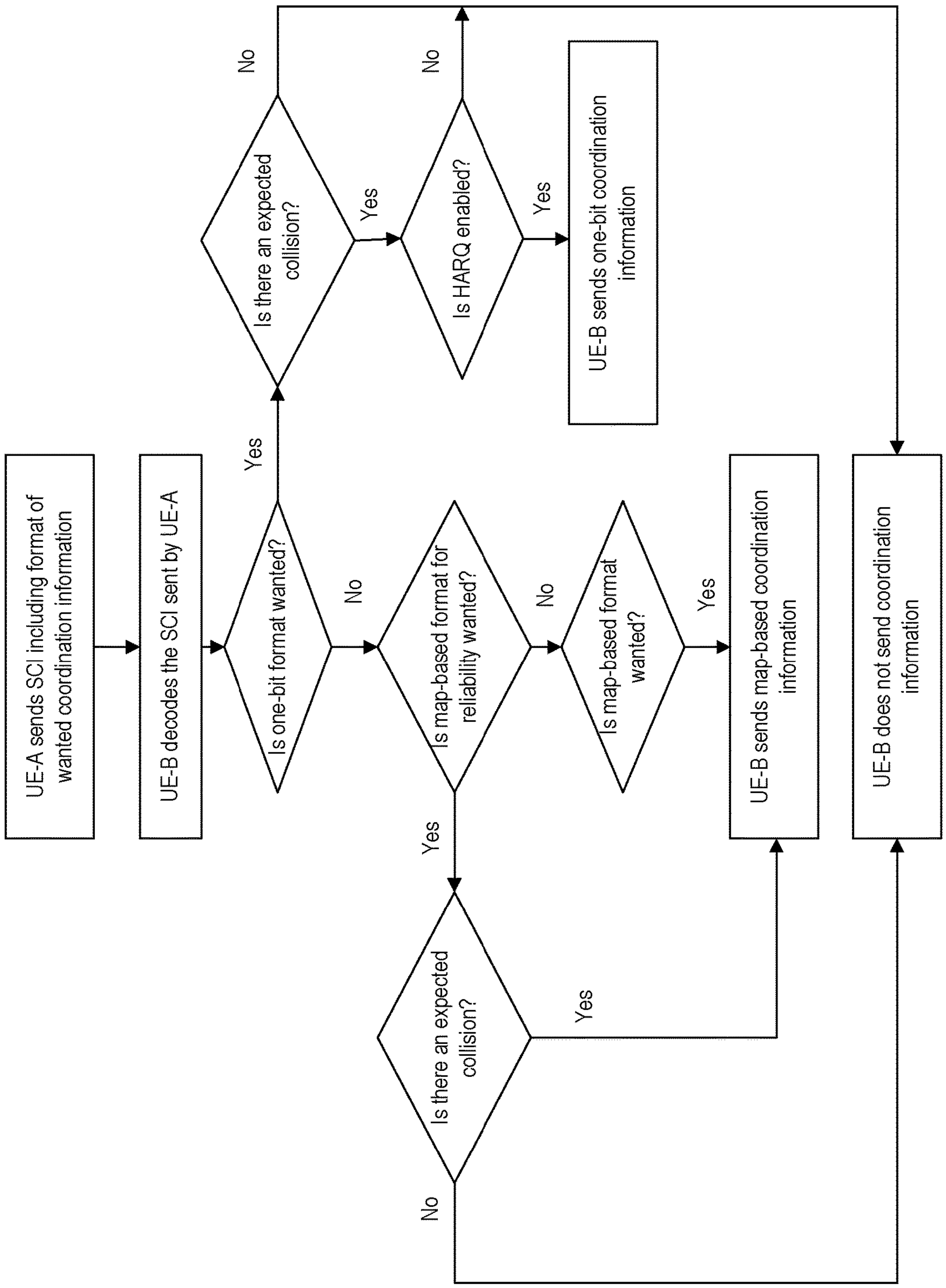
FIG. 8 illustrates a flowchart illustrating a coordination message request operation according to embodiments of the present disclosure.
Figure 9:
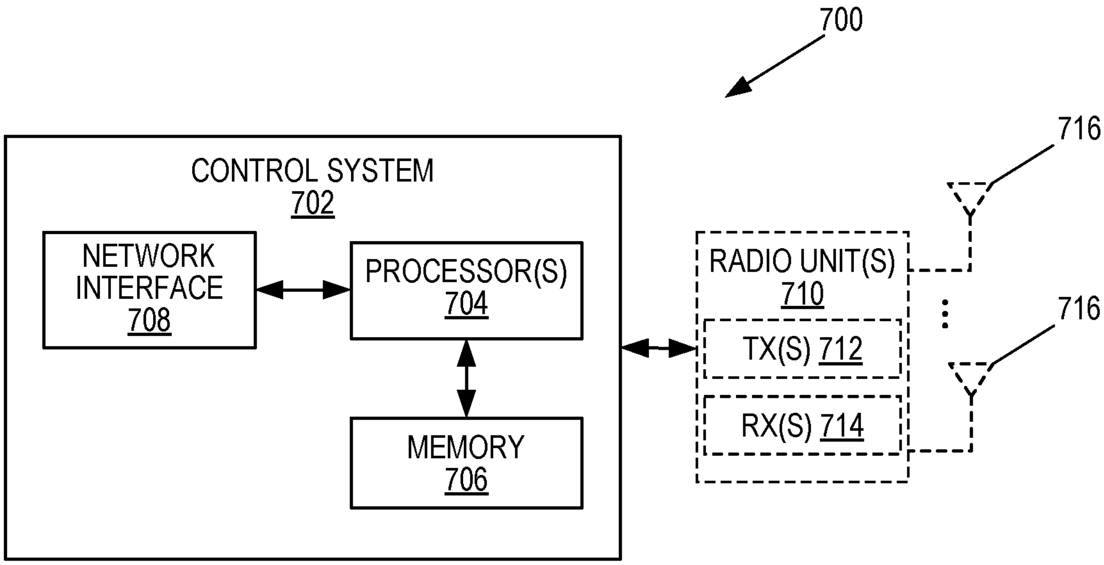
FIG. 9 illustrates a schematic block diagram of a radio access node 700 according to some embodiments of the present disclosure.

FIG. 8 is a flowchart illustrating a coordination message request operation according to embodiments of the present disclosure. The flowchart indicates the behavior of UE-B based on the coordination information request (e.g., coordination message) sent from UE-A. If the SCI from UE-A does not contain a coordination request the procedure in the flowchart is not performed. Upon receiving and decoding the coordination information request from UE-A, the following operations are performed by UE-B:

- UE-B checks the wanted format for the coordination information
  - If one-bit format is required and a collision is expected while HARQ feedback is enabled, then UE-B sends the one-bit coordination information
  - If one-bit format is required and a collision is not expected or/and HARQ feedback is not enabled, then UE-B does not send the coordination information
  - If map-based format for reliability (i.e., 0011 in SCI) is required and a collision is not expected, then UE-B does not send the coordination information
  - If map-based format for reliability (i.e., 0011 in SCI) is required and a collision is expected, then UE-B sends the coordination information.
  - If map-based format for optimization (i.e., 0010 in SCI) is required, then UE-B sends the coordination information FIG. 9 is a schematic block diagram of a radio access node 700 according to some embodiments of the present disclosure. Optional features are represented by dashed boxes. The radio access node 700 may be, for example, a base station 302 or 306 or a network node that implements all or part of the functionality of the base station 302 or gNB described herein. As illustrated, the radio access node 700 includes a control system 702 that includes one or more processors 704 (e.g., Central Processing Units (CPUs), Application Specific Integrated Circuits (ASICs), Field Programmable Gate Arrays (FPGAS), and/or the like), memory 706, and a network interface 708. The one or more processors 704 are also referred to herein as processing circuitry. In addition, the radio access node 700 may include one or more radio units 710 that each includes one or more transmitters 712 and one or more receivers 714 coupled to one or more antennas 716. The radio units 710 may be referred to or be part of radio interface circuitry. In some embodiments, the radio unit(s) 710 is external to the control system 702 and connected to the control system 702 via, e.g., a wired connection (e.g., an optical cable). However, in some other embodiments, the radio unit(s) 710 and potentially the antenna(s) 716 are integrated together with the control system 702. The one or more processors 704 operate to provide one or more functions of a radio access node 700 as described herein. In some embodiments, the function(s) are implemented in software that is stored, e.g., in the memory 706 and executed by the one or more processors 704.

Figure 10:
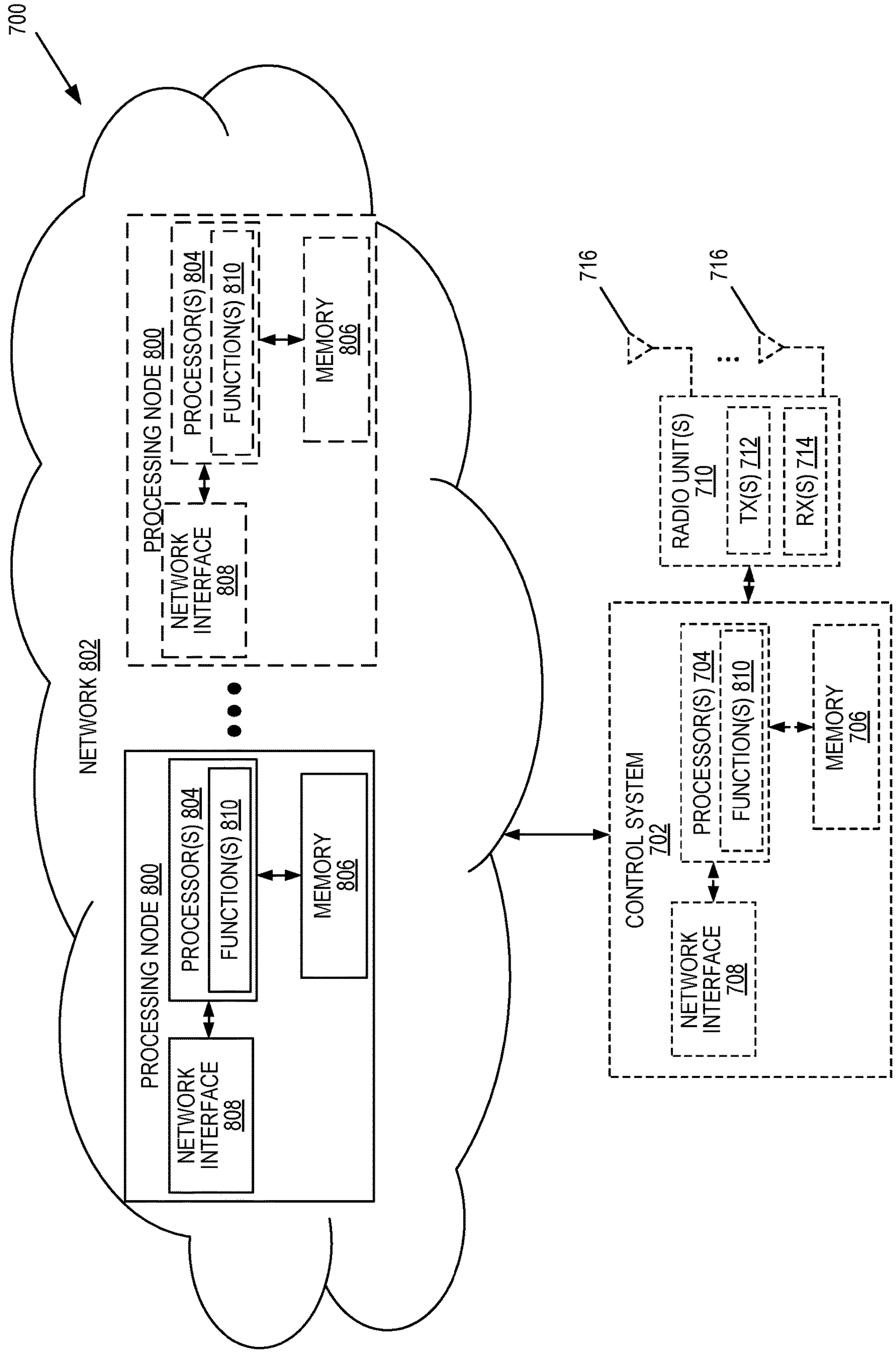
FIG. 10 illustrates a schematic block diagram that illustrates a virtualized embodiment of the radio access node 700 according to some embodiments of the present disclosure.

FIG. 10 is a schematic block diagram that illustrates a virtualized embodiment of the radio access node 700 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 700 in which at least a portion of the functionality of the radio access node 700 is implemented as a virtual component(s) (e.g., via a virtual machine(s) executing on a physical processing node(s) in a network(s)). As illustrated, in this example, the radio access node 700 may include the control system 702 and/or the one or more radio units 710, as described above. The control system 702 may be connected to the radio unit(s) 710 via, for example, an optical cable or the like. The radio access node 700 includes one or more processing nodes 800 coupled to or included as part of a network(s) 802. If present, the control system 702 or the radio unit(s) are connected to the processing node(s) 800 via the network 802. Each processing node 800 includes one or more processors 804 (e.g., CPUs, ASICs, FPGAs, and/or the like), memory 806, and a network interface 808.

In this example, functions 810 of the radio access node 700 described herein are implemented at the one or more processing nodes 800 or distributed across the one or more processing nodes 800 and the control system 702 and/or the radio unit(s) 710 in any desired manner. In some particular embodiments, some or all of the functions 810 of the radio access node 700 described herein are implemented as virtual components executed by one or more virtual machines implemented in a virtual environment(s) hosted by the processing node(s) 800. As will be appreciated by one of ordinary skill in the art, additional signaling or communication between the processing node(s) 800 and the control system 702 is used in order to carry out at least some of the desired functions 810. Notably, in some embodiments, the control system 702 may not be included, in which case the radio unit(s) 710 communicate directly with the processing node(s) 800 via an appropriate network interface(s).

In some embodiments, a computer program including instructions which, when executed by at least one processor, causes the at least one processor to carry out the functionality of radio access node 700 or a node (e.g., a processing node 800) implementing one or more of the functions 810 of the radio access node 700 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
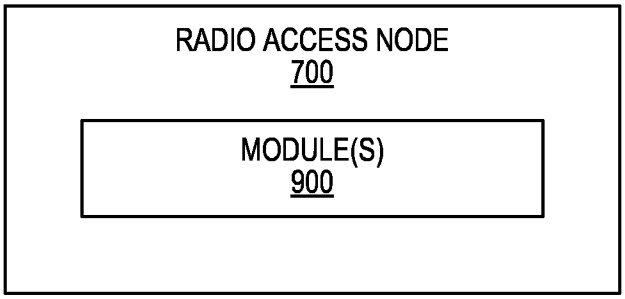
FIG. 11 illustrates a schematic block diagram of the radio access node 700 according to some other embodiments of the present disclosure.

FIG. 11 is a schematic block diagram of the radio access node 700 according to some other embodiments of the present disclosure. The radio access node 700 includes one or more modules 900, each of which is implemented in software. The module(s) 900 provide the functionality of the radio access node 700 described herein. This discussion is equally applicable to the processing node 800 of FIG. 8 where the modules 900 may be implemented at one of the processing nodes 800 or distributed across multiple processing nodes 800 and/or distributed across the processing node(s) 800 and the control system 702.

Figure 12:
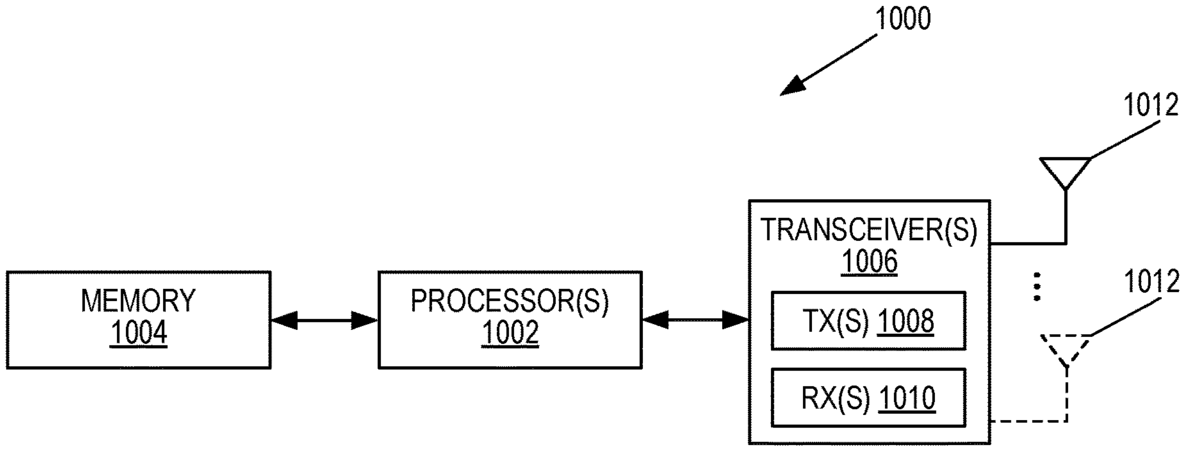
FIG. 12 illustrates a schematic block diagram of a wireless communication device 1000 according to some embodiments of the present disclosure.

FIG. 12 is a schematic block diagram of a wireless communication device 1000 according to some embodiments of the present disclosure. The wireless communication device 1000 may be a transmitting wireless communication device 1000-A or a receiving wireless communication device 1000-B. When serving as the transmitting wireless communication device 1000-A, it may be configured to perform the method of FIG. 6. It may also perform other actions in the procedure to request coordination information, as illustrated in FIG. 4. When serving as the receiving wireless communication device 1000-B, it may be configured to perform the method of FIG. 7. It may also perform other actions in the procedure to provide coordination information, as illustrated in FIG. 5. Descriptions are not repeated here for brevity. As illustrated in FIG. 12, the wireless communication device 1000 includes one or more processors 1002 (e.g., CPUs, ASICs, FPGAs, and/or the like), memory 1004, and one or more transceivers 1006 each including one or more transmitters 1008 and one or more receivers 1010 coupled to one or more antennas 1012. The transceiver(s) 1006 includes radio-front end circuitry connected to the antenna(s) 1012 that is configured to condition signals communicated between the antenna(s) 1012 and the processor(s) 1002, as will be appreciated by one of ordinary skill in the art. The processors 1002 are also referred to herein as processing circuitry. The transceivers 1006 are also referred to herein as radio circuitry. In some embodiments, the functionality of the wireless communication device 1000 described above may be fully or partially implemented in software, that is, e.g., stored in the memory 1004 and executed by the processor(s) 1002. Note that the wireless communication device 1000 may include additional components not illustrated in FIG. 10 such as, e.g., one or more user interface components (e.g., an input/output interface including a display, buttons, a touch screen, a microphone, a speaker(s), and/or the like and/or any other components for allowing input of information into the wireless communication device 1000 and/or allowing output of information from the wireless communication device 1000), a power supply (e.g., a battery and associated power circuitry), etc.

In some embodiments, a computer program including instructions which, when executed by at least one processor, causes the at least one processor to carry out the functionality of the wireless communication device 1000 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
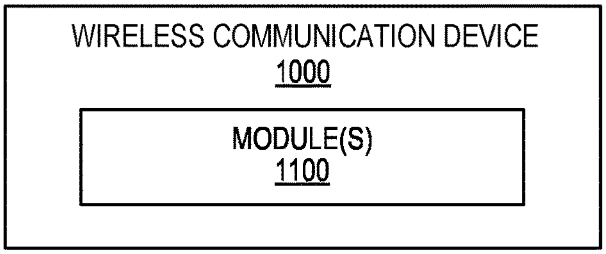
FIG. 13 illustrates a schematic block diagram of the wireless communication device 1000 according to some other embodiments of the present disclosure.

FIG. 13 is a schematic block diagram of the wireless communication device 1000 according to some other embodiments of the present disclosure. The wireless communication device 1000 includes one or more modules 1100, each of which is implemented in software. The module(s) 1100 provide the functionality of the wireless communication device 1000 described herein. The module(s) 1100 may provide the functionality of the transmitting wireless device 1000-A. The module(s) 1100 may also provide the functionality of the receiving wireless device 1000-B.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

EXAMPLES

Group A EXAMPLES

E1. A method performed by a transmitting wireless device for enabling coordination, the method comprising:
transmitting (402) a coordination message to a receiving wireless device to indicate whether a coordination information is expected.

E2. The method of example E1, wherein transmitting (402) the coordination message comprises transmitting (402-1) the coordination message comprising a Sidelink Control Information, SCI.

E3. The method of example E2, wherein the SCI comprises one or more reserved bits encoded as one of:
(00)00 to indicate that the coordination information is not expected;
(00)01 to indicate that the coordination information (e.g., 1-bit coordination information) is expected to be sent in accordance with the Inter-User Equipment, UE, Coordination Scheme 2 format;
(00)10 to indicate that the coordination information (e.g., map-based coordination information) is expected to be sent in accordance with the Inter-UE Coordination Scheme 1 format and independent of whether a potential collision is present; and
(00)11 to indicate that the coordination information (e.g., map-based coordination information) is expected to be sent in accordance with the Inter-UE Coordination Scheme 1 format and in presence of the potential collision.

E4. The method of example E2, wherein the SCI comprises an explicit field configured to indicate that the coordination information is expected.

E5. The method of any of examples E2 to E4, further comprising determining (400) that the receiving wireless device is in range.

E6. The method of example E5, wherein determining (400) that the receiving wireless device is in range comprises determining (400-1) that the receiving wireless device can decode the SCI.

E7. The method of any of examples E1 to E6, further comprising receiving (404) the coordination information from the receiving wireless device in response to the coordination message indicating that the coordination information is expected.

Group B EXAMPLES

E8. A method performed by a receiving wireless device for enabling coordination, the method comprising:
receiving (500) a coordination message from a transmitting wireless device that indicates whether a coordination information is expected; and
transmitting (502) the coordination information to the transmitting wireless device in response to the coordination message indicating that the coordination information is expected.

E9. The method of example E8, wherein receiving (500) the coordination message comprises receiving (500-1) the coordination message comprising a Sidelink Control Information, SCI.

E10. The method of example E9, wherein the SCI comprises one or more reserved bits encoded as one of:

(00)00 to indicate that the coordination information is not expected;

(00)01 to indicate that the coordination information (e.g., 1-bit coordination information) is expected to be sent in accordance with the Inter-User Equipment, UE, Coordination Scheme 2 format;

(00)10 to indicate that the coordination information (e.g., map-based coordination information) is expected to be sent in accordance with the Inter-UE Coordination Scheme 1 format and independent of whether a collision is present; and (00)11 to indicate that the coordination information (e.g., map-based coordination information) is expected to be sent in accordance with the Inter-UE Coordination Scheme 1 format and in presence of the collision.

E11. The method of example E10, wherein transmitting (502) the coordination information comprises checking (502-1) the one or more reserved bits in the SCI to determine whether the coordination information is requested.

E12. The method of example E11, wherein transmitting (502) the coordination information further comprises one of:

transmitting (502-2) the coordination information (e.g., 1-bit coordination information) in accordance with the Inter-UE Coordination Scheme 2 format if the one or more reserved bits are encoded as (00)01 and Hybrid Automatic Repeat Request, HARQ, is enabled; and not transmitting (502-3) the coordination information if the one or more reserved bits are encoded as (00)01 or the HARQ feedback is disabled.

E13. The method of example E11, wherein transmitting (502) the coordination information further comprises checking (502-4) a time/frequency field in the SCI to determine whether the collision is expected if the one or more reserved bits are encoded as (00)10 or (00)11.

E14. The method of example E13, wherein transmitting (502) the coordination information further comprises not transmitting (502-5) the coordination information if the one or more reserved bits are encoded as (00)10 or (00)11 and the collision is not expected.

E15. The method of example E13, wherein transmitting (502) the coordination information further comprises transmitting (502-6) the coordination information in accordance with the Inter-UE Coordination Scheme 1 format if the one or more reserved bits are encoded as (00)10 or (00)11 and the collision is expected.

E16. The method of example E9, wherein the SCI comprises an explicit field configured to indicate that the coordination information is expected.

Group C EXAMPLES

E17. A wireless device (1000) for enabling coordination, the wireless device (1000) comprising:

processing circuitry (1002, 1006) configured to perform any of the steps of any of the Group A examples; and power supply circuitry configured to supply power to the wireless device (1000).

E18. A wireless device (1000) for enabling coordination, the wireless device (1000) comprising:

processing circuitry (1002, 1006) configured to perform any of the steps of any of the Group B examples; and power supply circuitry configured to supply power to the wireless device (1000).

E19. A User Equipment, UE, for enabling coordination, the UE comprising:

an antenna configured to send and receive wireless signals;

radio front-end circuitry connected to the antenna and to processing circuitry, and configured to condition signals communicated between the antenna and the processing circuitry;

the processing circuitry being configured to perform any of the steps of any of the Group A and/or Group B examples;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

Abbreviations

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Management Function
AN Access Network
ASIC Application Specific Integrated Circuit
AUSF Authentication Server Function
CPU Central Processing Unit
D2D Device-to-Device
DCI Downlink Control Information
DN Data Network
DSP Digital Signal Processor
eNB Enhanced or Evolved Node B
EPC Evolved Packet Core
E-UTRA
Evolved Universal Terrestrial Radio Access
FPGA Field Programmable Gate Array
gNB New Radio Base Station
gNB-CU New Radio Base Station Central Unit
gNB-DU New Radio Base Station Distributed Unit
HARQ Hybrid Automatic Repeat Request
HSS Home Subscriber Server
IOT Internet of Things
IP Internet Protocol
IUC Inter-UE Coordination
LTE Long Term Evolution
MAC Medium Access Control
MME Mobility Management Entity
MTC Machine Type Communication
NEF Network Exposure Function
NF Network Function
NR New Radio
NRF Network Function Repository Function
NSSF Network Slice Selection Function
NW Network OTT Over-the-Top
PC Personal Computer
PCF Policy Control Function
PDSCH Physical Downlink Shared Channel
P-GW Packet Data Network Gateway
ProSe Proximity Services
PRR Package Reception Ratio
PIR Packet Inter-Reception
PRS Positioning Reference Signal
PSCCH Physical SL Control Channel
PSFCH Physical SL Feedback Channel
PSSCH Physical SL Shared Channel
Qos Quality of Service
RAM Random Access Memory
RAN Radio Access Network
ROM Read Only Memory
RP Reception Point
RRH Remote Radio Head
RTT Round Trip Time
SCEF Service Capability Exposure Function
SCI Sidelink Control Information
SL Sidelink
SMF Session Management Function
TCI Transmission Configuration Indicator
TP Transmission Point
TRP Transmission/Reception Point
UC Use Case
UDM Unified Data Management
UE User Equipment
UPF User Plane Function
V2X Vehicle-to-Everything/Anything

The invention claimed is:

1. A method performed by a transmitting wireless device for enabling coordination with a receiving wireless device, the method comprising:
 transmitting, to the receiving wireless device, a coordination message that indicates whether coordination information is expected, wherein the coordination message comprises a Sidelink Control Information, SCI, that indicates whether the coordination information is expected and wherein the SCI comprises one or more reserved bits encoded as one of:
  01 or 0001 to indicate that 1-bit coordination information is expected to be sent in accordance with an Inter-User Equipment, UE, Coordination Scheme 2 format;
  10 or 0010 to indicate that map-based coordination information is expected to be sent in accordance with an Inter-UE Coordination Scheme 1 format independently of whether a collision is expected; and
  11 or 0011 to indicate that map-based coordination information is expected to be sent in accordance with the Inter-UE Coordination Scheme 1 format in case the collision is expected; and
 receiving, in response to the coordination message indicating that the coordination information is expected, the coordination information from the receiving wireless device in accordance with a format indicated in the coordination message.

2. The method of claim 1, wherein the SCI comprises a field configured to indicate that the coordination information is expected.

3. The method of claim 1, further comprising determining that the receiving wireless device is within a distance where it is able to decode the SCI.

4. The method of claim 1, wherein the coordination message indicates, based on the one or more reserved bits in the SCI, that the coordination information is expected.

5. The method of claim 1, wherein receiving the coordination information further comprises, in response to the coordination message indicating that the 1-bit coordination information is expected while Hybrid Automatic Repeat Request, HARQ, is enabled and a collision is expected, receiving the coordination information in accordance with the Inter-UE Coordination Scheme 2 format.

6. A method performed by a receiving wireless device for enabling coordination with a transmitting wireless device, the method comprising:
 receiving, from the transmitting wireless device, a coordination message that indicates whether coordination information is expected, wherein the coordination message comprises a Sidelink Control Information, SCI, that indicates whether the coordination information is expected and wherein the SCI comprises one or more reserved bits encoded as one of:
  01 or 0001 to indicate that 1-bit coordination information is expected to be sent in accordance with an Inter-User Equipment, UE, Coordination Scheme 2 format;
  10 or 0010 to indicate that map-based coordination information is expected to be sent in accordance with an Inter-UE Coordination Scheme 1 format independently of whether a collision is expected; and
  11 or 0011 to indicate that map-based coordination information is expected to be sent in accordance with the Inter-UE Coordination Scheme 1 format in case the collision is expected; and
 transmitting, in response to the coordination message indicating that the coordination information is expected, the coordination information to the transmitting wireless device in accordance with a format indicated in the coordination message.

7. The method of claim 6, wherein the SCI comprises a field configured to indicate that the coordination information is expected.

8. The method of claim 6, wherein transmitting the coordination information comprises determining, based on the one or more reserved bits in the SCI, that the coordination information is expected.

9. The method of claim 8, wherein transmitting the coordination information further comprises one of:
 transmitting the 1-bit coordination information in accordance with the Inter-UE Coordination Scheme 2 format when the one or more reserved bits are encoded as 01 or 0001 and a Hybrid Automatic Repeat Request, HARQ, is enabled; and
 not transmitting the coordination information when the one or more reserved bits are encoded as 01 or 0001 or the HARQ feedback is disabled.

10. The method of claim 8, wherein transmitting the coordination information further comprises determining, based on a time/frequency field in the SCI, whether the collision is expected when the one or more reserved bits are encoded as 11 or 0011.

11. The method of claim 10, wherein transmitting the coordination information further comprises not transmitting the coordination information when the one or more reserved bits are encoded as 10, 0010, 11, or 0011 and the collision is not expected.

12. The method of claim 10, wherein transmitting the coordination information further comprises transmitting the coordination information in accordance with the Inter-UE Coordination Scheme 1 format when the one or more reserved bits are encoded as 10, 0010, 11, or 0011 and the collision is expected.

13. The method of claim 6, wherein transmitting the coordination information further comprises, in response to the coordination message indicating that the 1-bit coordination information is expected while a Hybrid Automatic Repeat Request, HARQ, is enabled and a collision is expected, transmitting the coordination information in accordance with the Inter-UE Coordination Scheme 2 format.

14. A wireless device for enabling coordination with a receiving wireless device, the wireless device comprising:
- one or more transmitters;
- one or more receivers; and
- processing circuitry associated with the one or more transmitters and the one or more receivers, the processing circuitry configured to cause the wireless device to:
  - transmit a coordination message to the receiving wireless device that indicates whether coordination information is expected, wherein the coordination message comprises a Sidelink Control Information, SCI, that indicates whether the coordination information is expected and wherein the SCI comprises one or more reserved bits encoded as one of:
    - 01 or 0001 to indicate that 1-bit coordination information is expected to be sent in accordance with an Inter-User Equipment, UE, Coordination Scheme 2 format;
    - 10 or 0010 to indicate that map-based coordination information is expected to be sent in accordance with an Inter-UE Coordination Scheme 1 format independently of whether a collision is expected; and
    - 11 or 0011 to indicate that map-based coordination information is expected to be sent in accordance with the Inter-UE Coordination Scheme 1 format in case the collision is expected; and
  - receive, in response to the coordination message indicating that the coordination information is expected, the coordination information from the receiving wireless device in accordance with a format indicated in the coordination message.

15. A wireless device for enabling coordination with a transmitting wireless device, the wireless device comprising:
- one or more transmitters;
- one or more receivers; and
- processing circuitry associated with the one or more transmitters and the one or more receivers, the processing circuitry configured to cause the wireless device to:
  - receive, from the transmitting wireless device, a coordination message that indicates whether coordination information is expected, wherein the coordination message comprises a Sidelink Control Information, SCI, that indicates whether the coordination information is expected and wherein the SCI comprises one or more reserved bits encoded as one of:
    - 01 or 0001 to indicate that 1-bit coordination information is expected to be sent in accordance with an Inter-User Equipment, UE, Coordination Scheme 2 format;
    - 10 or 0010 to indicate that map-based coordination information is expected to be sent in accordance with an Inter-UE Coordination Scheme 1 format independently of whether a collision is expected; and
    - 11 or 0011 to indicate that map-based coordination information is expected to be sent in accordance with the Inter-UE Coordination Scheme 1 format in case the collision is expected; and
  - transmit, in response to the coordination message indicating that the coordination information is expected, the coordination information to the transmitting wireless device in accordance with a format indicated in the coordination message.

* * * * *